(12) United States Patent
Hirai et al.

(10) Patent No.: US 6,951,030 B2
(45) Date of Patent: Sep. 27, 2005

(54) DATA BROADCAST APPARATUS CAPABLE OF STOPPING REPRODUCTION OF BROADCAST DATA IN RECEPTION APPARATUS WHEN AN EVENT REQUIRING TO STOP THE REPRODUCTION OF THE BROADCAST DATA OCCURS

(75) Inventors: Junichi Hirai, Suita (JP); Toshiya Mori, Settsu (JP); Akihiro Tanaka, Moriguchi (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 1035 days.

(21) Appl. No.: 09/838,747

(22) Filed: Apr. 19, 2001

(65) Prior Publication Data

US 2002/0010937 A1 Jan. 24, 2002

(30) Foreign Application Priority Data

Apr. 21, 2000 (JP) .................................... 2000-120764

(51) Int. Cl.⁷ ................................................ H04N 7/025
(52) U.S. Cl. ............................ 725/33; 725/32; 725/36; 725/146; 725/152
(58) Field of Search ........................ 725/32, 33, 132, 725/140, 145, 146, 152; 386/46, 83

(56) References Cited

U.S. PATENT DOCUMENTS

| 3,975,583 | A  | * | 8/1976 | Meadows ................ 348/460 |
| 6,240,280 | B1 | * | 5/2001 | Ravi et al. ............. 455/161.1 |
| 6,446,262 | B1 | * | 9/2002 | Malaure et al. ............ 725/141 |
| 6,543,051 | B1 | * | 4/2003 | Manson et al. ............. 725/33 |

FOREIGN PATENT DOCUMENTS

| JP | 10264647   | 10/1998 |
| JP | 2000101528 | 4/2000  |

* cited by examiner

*Primary Examiner*—Ngoc K. Vu

(57) ABSTRACT

A data broadcast apparatus repeatedly broadcasts data using a carousel method, to a reception apparatus which stores the data into a memory and reproduces the data stored in the memory. A storing unit stores first data and second data. A detecting unit detects an event which prohibits the reception apparatus from reproducing the first data. A broadcasting unit repeatedly broadcasts the first and second data stored in the storing unit, and stops broadcasting the first data when the detecting unit detects the event. An instructing unit has the broadcasting unit broadcast a switch instruction, which instructs the reception apparatus to stop reproducing the first data and start reproducing the second data when the broadcast of the first data is stopped.

42 Claims, 9 Drawing Sheets

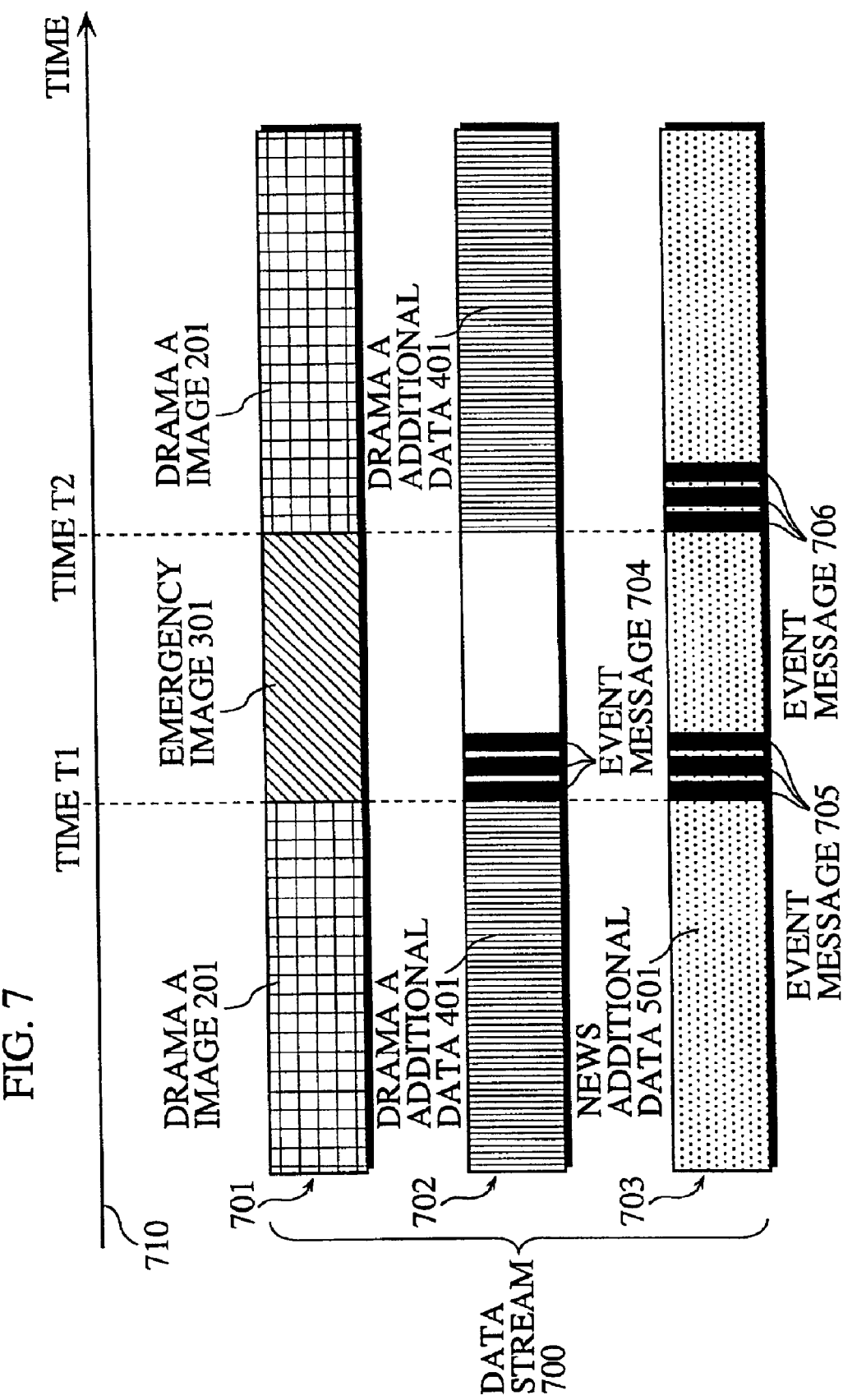

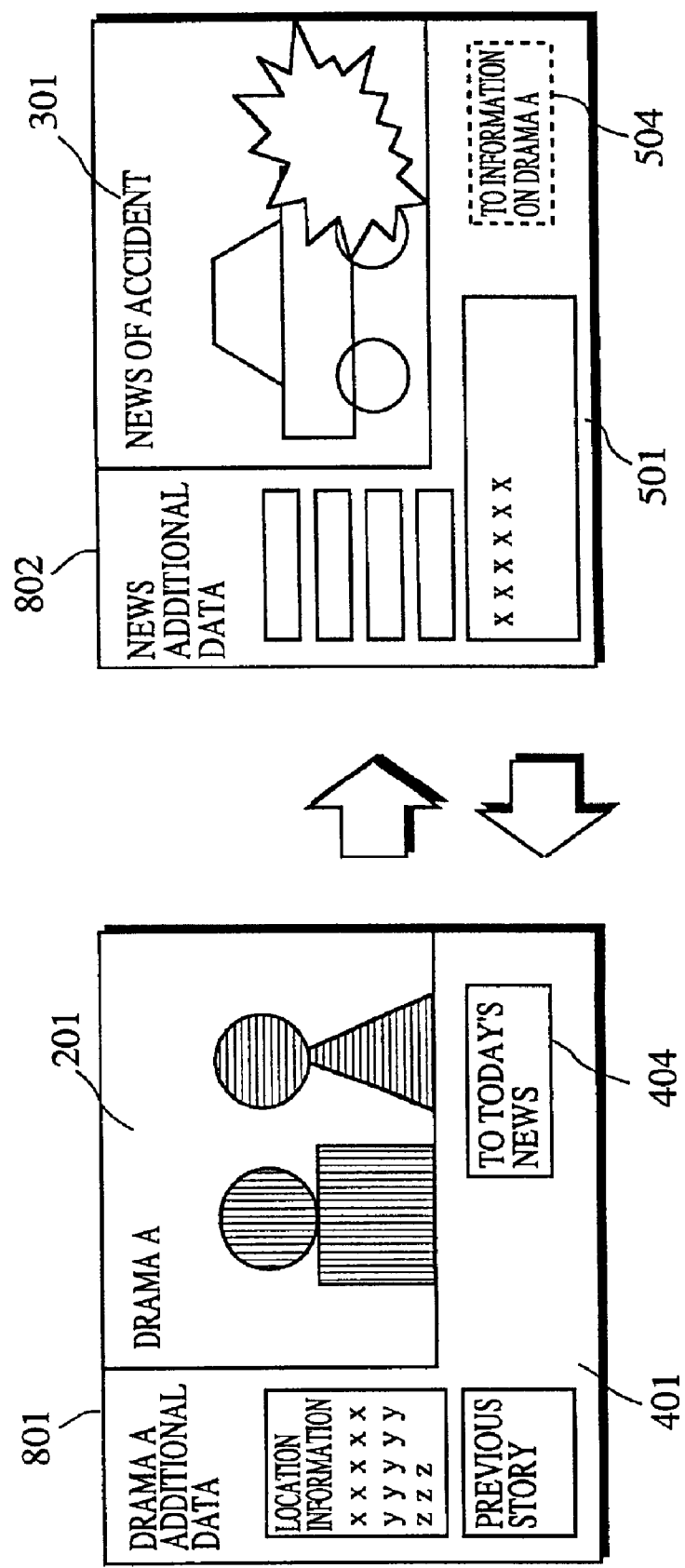

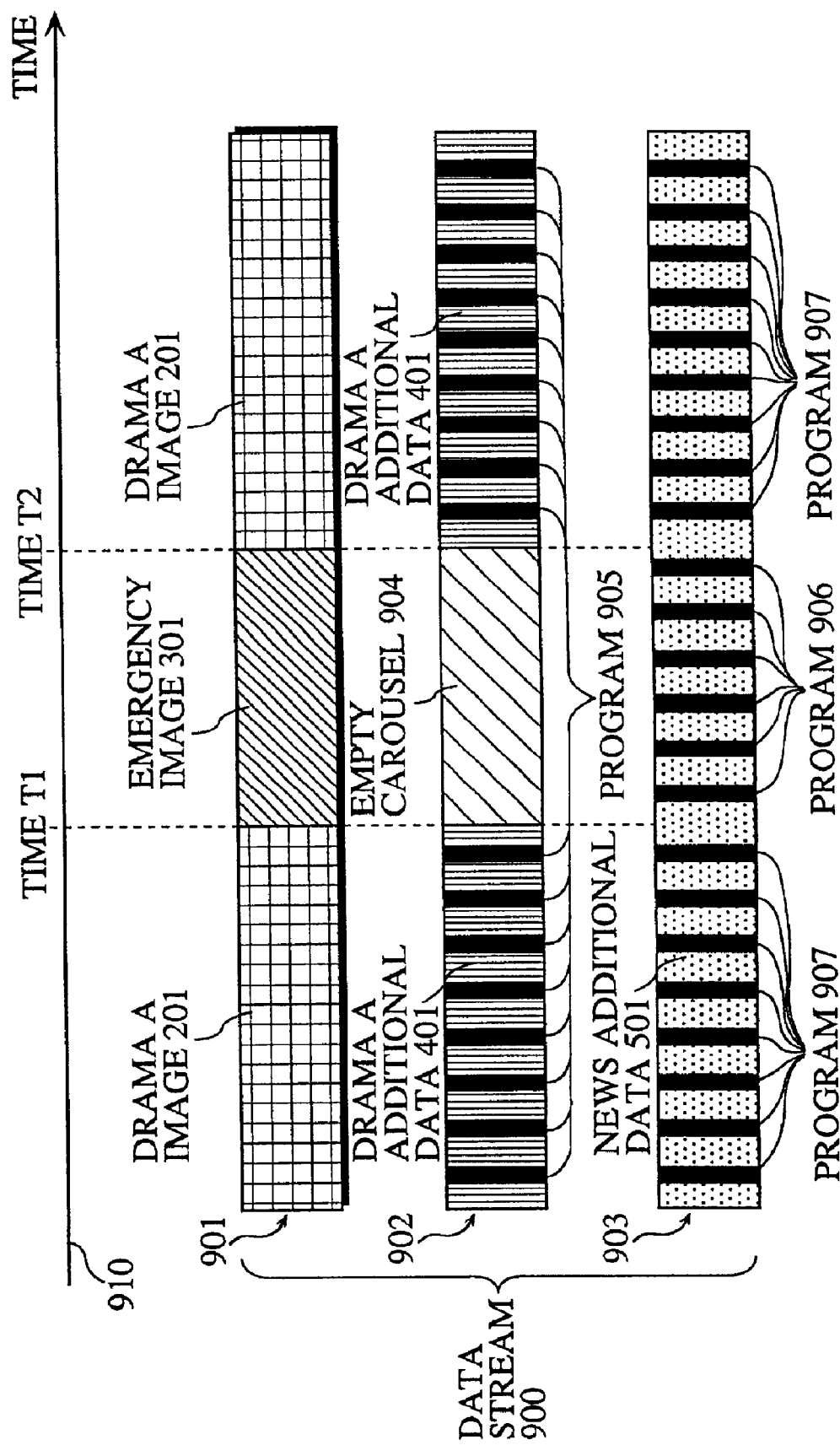

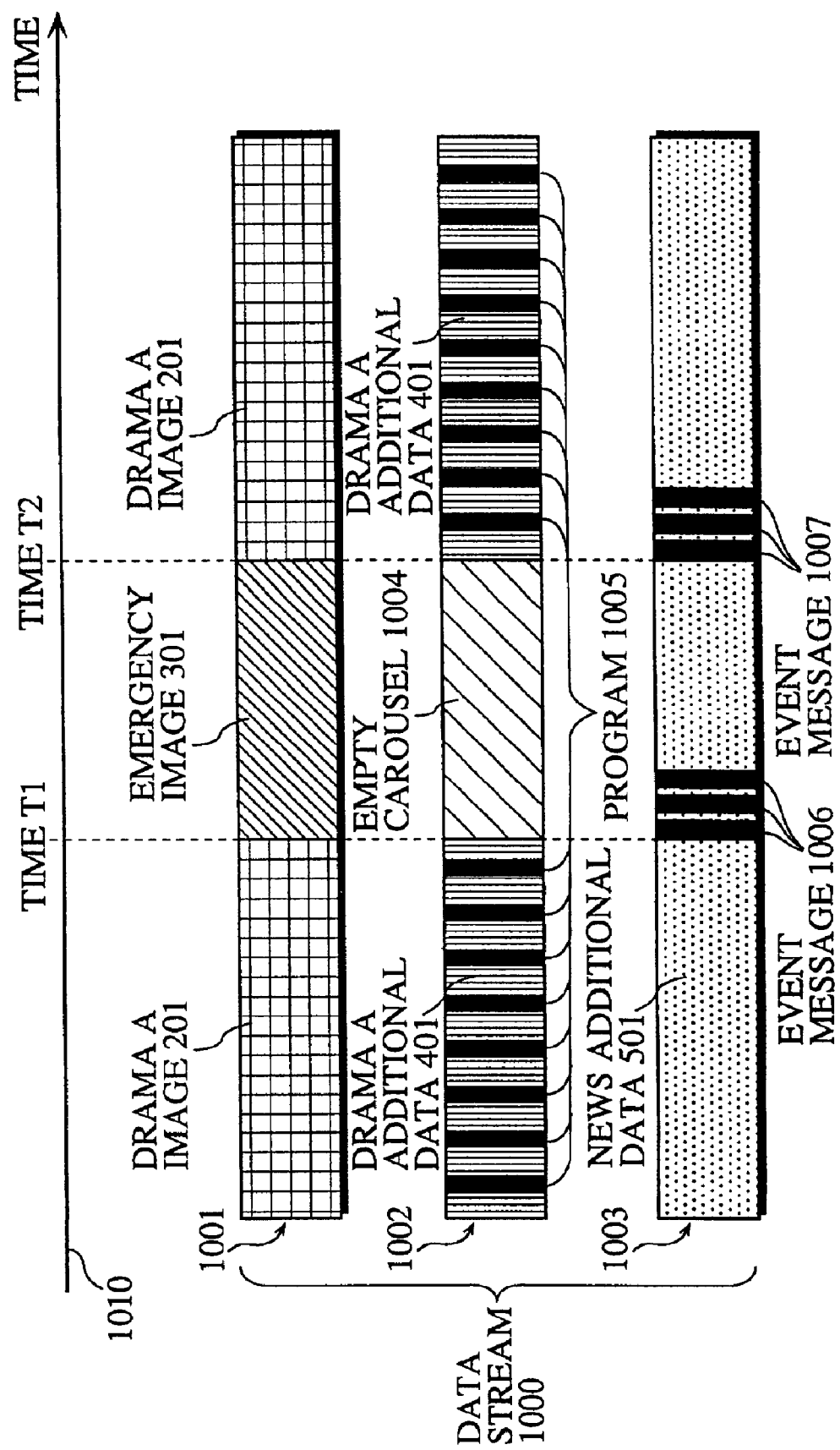

DATA BROADCAST APPARATUS CAPABLE OF STOPPING REPRODUCTION OF BROADCAST DATA IN RECEPTION APPARATUS WHEN AN EVENT REQUIRING TO STOP THE REPRODUCTION OF THE BROADCAST DATA OCCURS

This application is based on application No. 2000-120764 filed in Japan, the content of which is hereby incorporated by reference.

BACKGROUND OF THE INVENTION (1) Field of the Invention

The present invention relates to a data broadcast apparatus which multiplexes data of a TV program and additional data for the TV program and broadcasts them. The invention in particular relates to techniques for controlling reproduction of additional data in a reception apparatus when, for instance, a TV program which is being broadcast is interrupted for a TV program of higher priority.

(2) Related Art

In recent digital broadcasting, additional data such as character information is multiplexed with program data such as video and audio and broadcast.

In general, the same or renewed additional data is repeatedly multiplexed with program data and broadcast, with a cycle of about 5 to 10 seconds.

A data broadcast apparatus that performs such digital broadcasting is disclosed in Japanese Laid-Open Patent Application No. H10-313449.

The most common method used for periodic broadcast of additional data is the Data Carousel (hereafter simply called "carousel method") specified by the internationally standardized DSM-CC (Digital Storage Media—Command and Control) (described in detail in Information Technology—Generic Coding of Moving Pictures and Associated Audio: DSM-CC-ISO/IEC 13818-6). Broadcast of additional data according to the carousel method has been adopted for BS digital broadcasting service and the like in Japan (described in detail in the ARIB STD-B24 specification "Data Broadcast Coding and Transmission in Digital Broadcasting").

With this method of repeatedly transmitting additional data, a reception apparatus can receive only necessary additional data and reproduce it, with it being possible to utilize enormous amounts of information without a large-capacity memory.

Here, while additional data relating to a TV program is being broadcast by the carousel method, an interruption by an important news program may occur, or the additional data may be found to contain improper content. In such cases, it is desirable to stop the presentation of the additional data to a viewer immediately.

However, even when the data broadcast apparatus stops broadcasting the additional data at once, it does not necessarily mean that the reception apparatus will stop presenting the additional data to the viewer immediately.

The reason for this is as follows. Since the reception apparatus stores the additional data being broadcast by the data broadcast apparatus into a memory and reproduces the additional data stored in the memory, even when no longer receiving the additional data, the reception apparatus continues to reproduce the additional data as long as it is present in the memory.

Also, the additional data may contain a link to other additional data, so that the viewer who is viewing the additional data can jump to the other additional data by selecting, with a remote control or the like, a button included in the additional data to provide a link to the other additional data. The details on this are shown in the ARIB STD-B24 specification "Data Broadcast Coding and Transmission in Digital Broadcasting".

Here, if the other additional data to which the viewer has jumped contains a button providing a link to the additional data the broadcast of which has stopped, the viewer may select that button and thereby cause an error in the reception apparatus.

To prevent this, when it is necessary to stop presentation of additional data immediately, instead of the additional data the conventional data broadcast apparatus broadcasts additional data called "trouble slide" which merely presents an insignificant message such as "Please Wait for a Moment", so that the reception apparatus replaces the additional data stored in the memory with this additional data to immediately stop presenting the additional data the broadcast of which has been stopped (described in detail in Japanese Laid-Open Patent Application No. H10-264647).

However, presenting such an insignificant message just to stop presentation of additional data not only causes a great deal of inconvenience to the viewer, but also wastes the transmission band for broadcasting the trouble slide.

SUMMARY OF THE INVENTION

The present invention has an object of providing a data broadcast apparatus, method, and program that can instantly stop presentation of additional data to a viewer in a reception apparatus without broadcasting insignificant additional data such as a trouble slide.

The stated object can be achieved by a data broadcast apparatus for repeatedly broadcasting broadcast data using a carousel method, to a reception apparatus which stores the broadcast data into a memory and reproduces the broadcast data stored in the memory, including: a storing unit for storing first broadcast data and second broadcast data; a detecting unit for detecting a reproduction stop event which prohibits the reception apparatus from reproducing the first broadcast data; a broadcasting unit for (a) repeatedly broadcasting the first broadcast data and the second broadcast data stored in the storing unit, and (b) stopping the broadcast of the first broadcast data when the detecting unit detects the reproduction stop event; and an instructing unit for having the broadcasting unit broadcast a switch instruction, the switch instruction instructing the reception apparatus to stop reproducing the first broadcast data and start reproducing the second broadcast data when the broadcast of the first broadcast data is stopped.

With this construction, when the reproduction stop event is detected, the data broadcast apparatus not only stops broadcasting the first broadcast data, but also broadcasts the switch instruction which instructs the reception apparatus to stop reproducing the first broadcast data and start reproducing the second broadcast data.

Accordingly, the presentation of the first broadcast data to the viewer in the reception apparatus can be stopped instantly, without broadcasting insignificant broadcast data.

Here, the switch instruction may instruct the reception apparatus to stop reproducing the first broadcast data and start reproducing the second broadcast data upon receiving the switch instruction, wherein the instructing unit has the broadcasting unit broadcast the switch instruction when the detecting unit detects the reproduction stop event, so that the reception apparatus will stop reproducing the first broadcast data and start reproducing the second broadcast data upon receiving the switch instruction.

With this construction, the data broadcast apparatus broadcasts the switch instruction which instructs the reception apparatus to stop reproducing the first broadcast data immediately, when the reproduction stop event is detected.

Accordingly, the reception apparatus stops presenting the first broadcast data to the viewer as soon as it receives the switch instruction.

Here, the switch instruction may be broadcast as an event message or a module that has a specific identifier.

With this construction, the switch instruction can be broadcast as an event message or a module having a specific identifier.

Here, the broadcasting unit may start broadcasting an empty carousel corresponding to the first broadcast data when the detecting unit detects the reproduction stop event, wherein the switch instruction instructs the reception apparatus to stop reproducing the first broadcast data and start reproducing the second broadcast data upon starting to receive the empty carousel, and the instructing unit has the broadcasting unit broadcast the switch instruction before the detecting unit detects the reproduction stop event, so that the reception apparatus will stop reproducing the first broadcast data and start reproducing the second broadcast data upon starting to receive the empty carousel.

With this construction, the data broadcast apparatus broadcasts the switch instruction which instructs the reception apparatus to stop reproducing the first broadcast data on receiving the empty carousel, before the reproduction stop event is detected.

Accordingly, the reception apparatus stops presenting the first broadcast data to the viewer as soon as it receives the empty carousel.

Here, the switch instruction may instruct the reception apparatus to stop reproducing the first broadcast data and start reproducing the second broadcast data upon detecting that the reception apparatus no longer receives the first broadcast data, wherein the instructing unit has the broadcasting unit broadcast the switch instruction before the detecting unit detects the reproduction stop event, so that the reception apparatus will stop reproducing the first broadcast data and start reproducing the second broadcast data upon detecting that the reception apparatus no longer receives the first broadcast data.

With this construction, the data broadcast apparatus broadcasts the switch instruction which instructs the reception apparatus to stop reproducing the first broadcast data on detecting that the reception of the first broadcast data is stopped, before the reproduction stop event is detected.

Accordingly, the reception apparatus stops presenting the first broadcast data to the viewer as soon as it detects that the reception of the first broadcast data is stopped.

Here, after detecting the reproduction stop event, the detecting unit may detect a reproduction resume event which permits the reception apparatus to reproduce the first broadcast data, wherein the broadcasting unit resumes broadcasting the first broadcast data when the detecting unit detects the reproduction resume event, and the instructing unit has the broadcasting unit broadcast a return instruction, the return instruction instructing the reception apparatus to stop reproducing the second broadcast data and resume reproducing the first broadcast data when the broadcast of the first broadcast data is resumed.

With this construction, when the reproduction resume event is detected, the data broadcast apparatus not only resumes the broadcast of the first broadcast data, but also broadcasts the return instruction which instructs the reception apparatus to stop reproducing the second broadcast data and start reproducing the first broadcast data.

Accordingly, the presentation of the first broadcast data to the viewer can be resumed instantly in the reception apparatus.

Here, the return instruction may instruct the reception apparatus to stop reproducing the second broadcast data and resume reproducing the first broadcast data upon receiving the return instruction, wherein the instructing unit has the broadcasting unit broadcast the return instruction by attaching the return instruction to the second broadcast data when the detecting unit detects the reproduction resume event, so that the reception apparatus will stop reproducing the second broadcast data and resume reproducing the first broadcast data upon receiving the return instruction.

With this construction, the data broadcast apparatus broadcasts the return instruction which instructs the reception apparatus to resume reproducing the first broadcast data immediately, when the reproduction resume event is detected.

Accordingly, the reception apparatus resumes the presentation of the first broadcast data to the viewer as soon as it receives the return instruction.

Here, the return instruction may be broadcast as an event message or a module that has a specific identifier.

With this construction, the return instruction can be broadcast as an event message or a module having a specific identifier.

Here, the broadcasting unit may start broadcasting an empty carousel corresponding to the first broadcast data when the detecting unit detects the reproduction stop event, and stop broadcasting the empty carousel when the detecting unit detects the reproduction resume event, wherein the return instruction instructs the reception apparatus to stop reproducing the second broadcast data and resume reproducing the first broadcast data upon stopping receiving the empty carousel, and the instructing unit has the broadcasting unit broadcast the return instruction before the detecting unit detects the reproduction resume event, so that the reception apparatus will stop reproducing the second broadcast data and resume reproducing the first broadcast data upon stopping receiving the empty carousel.

With this construction, the data broadcast apparatus broadcasts the return instruction which instructs the reception apparatus to resume reproducing the first broadcast data on stopping the reception of the empty carousel, before the reproduction resume event is detected.

Accordingly, the reception apparatus resumes the presentation of the first broadcast data to the viewer as soon as it stops receiving the empty carousel.

Here, the return instruction may instruct the reception apparatus to stop reproducing the second broadcast data and resume reproducing the first broadcast data upon detecting that the reception apparatus resumes receiving the first broadcast data, wherein the instructing unit has the broadcasting unit broadcast the return instruction before the detecting unit detects the reproduction resume event, so that the reception apparatus will stop reproducing the second broadcast data and resume reproducing the first broadcast data upon detecting that the reception apparatus resumes receiving the first broadcast data.

With this construction, the data broadcast apparatus broadcasts the return instruction which instructs the reception apparatus to resume reproducing the first broadcast data on detecting that the reception of the first broadcast data is resumed, before the reproduction resume event is detected.

Accordingly, the reception apparatus resumes the presentation of the first broadcast data to the viewer as soon as it detects that the reception of the first broadcast data is resumed.

The stated object can also be achieved by a data broadcast apparatus for repeatedly broadcasting broadcast data using a carousel method, to a reception apparatus which stores the broadcast data into a memory and reproduces the broadcast data stored in the memory, including: a storing unit for storing first broadcast data and second broadcast data; a detecting unit for detecting a reproduction stop event which prohibits the reception apparatus from reproducing the first broadcast data; a broadcasting unit for (a) repeatedly broadcasting the first broadcast data and the second broadcast data stored in the storing unit, and (b) stopping the broadcast of the first broadcast data when the detecting unit detects the reproduction stop event; and an instructing unit for having the broadcasting unit broadcast a disable instruction, the disable instruction instructing the reception apparatus to refrain from switching reproduction from the second broadcast data to the first broadcast data when the broadcast of the first broadcast data is stopped.

With this construction, when the reproduction stop event is detected, the data broadcast apparatus not only stops broadcasting the first broadcast data, but also broadcasts the disable instruction which instructs the reception apparatus to refrain from switching the reproduction from the second broadcast data to the first broadcast data.

Accordingly, the switching of reproduction from the second broadcast data to the first broadcast data can be prohibited instantly in the reception apparatus.

Here, the disable instruction may instruct the reception apparatus to refrain from switching the reproduction from the second broadcast data to the first broadcast data upon receiving the disable instruction, wherein the instructing unit has the broadcasting unit broadcast the disable instruction when the detecting unit detects the reproduction stop event, so that the reception apparatus will refrain from switching the reproduction from the second broadcast data to the first broadcast data upon receiving the disable instruction.

With this construction, the data broadcast apparatus broadcasts the disable instruction which instructs the reception apparatus to refrain from reproducing the first broadcast data immediately, when the reproduction stop event is detected.

Accordingly, the reception apparatus refrains from switching reproduction from the second broadcast data to the first broadcast data, as soon as it receives the disable instruction.

Here, the disable instruction may be broadcast as an event message or a module that has a specific identifier.

With this construction, the disable instruction can be broadcast as an event message or a module having a specific identifier.

Here, the broadcasting unit may start broadcasting an empty carousel corresponding to the first broadcast data when the detecting unit detects the reproduction stop event, wherein the disable instruction instructs the reception apparatus to refrain from switching the reproduction from the second broadcast data to the first broadcast data upon starting to receive the empty carousel, and the instructing unit has the broadcasting unit broadcast the disable instruction before the detecting unit detects the reproduction stop event, so that the reception apparatus will refrain from switching the reproduction from the second broadcast data to the first broadcast data upon starting to receive the empty carousel.

With this construction, the data broadcast apparatus broadcasts the disable instruction which instructs the reception apparatus to refrain from reproducing the first broadcast data on receiving the empty carousel, before the reproduction stop event is detected.

Accordingly, the reception apparatus refrains from switching reproduction from the second broadcast data to the first broadcast data, as soon as it receives the empty carousel.

Here, the disable instruction may instruct the reception apparatus to refrain from switching the reproduction from the second broadcast data to the first broadcast data upon detecting that the reception apparatus no longer receives the first broadcast data, wherein the instructing unit has the broadcasting unit broadcast the disable instruction before the detecting unit detects the reproduction stop event, so that the reception apparatus will refrain from switching the reproduction from the second broadcast data to the first broadcast data upon detecting that the reception apparatus no longer receives the first broadcast data.

With this construction, the data broadcast apparatus broadcasts the disable instruction which instructs the reception apparatus to refrain from reproducing the first broadcast data on detecting that the reception of the first broadcast data is stopped, before the reproduction stop event is detected.

Accordingly, the reception apparatus refrains from switching reproduction from the second broadcast data to the first broadcast data, as soon as it detects that the reception of the first broadcast data is stopped.

The stated object can also be achieved by a data broadcast apparatus for continuously broadcasting program data, and repeatedly broadcasting additional data using a carousel method, to a reception apparatus which stores the additional data into a memory and reproduces the additional data stored in the memory, including: a storing unit for storing scheduled program data which is scheduled to be broadcast, related additional data which relates to the scheduled program data, and unrelated additional data which does not relate to the scheduled program data; an acquiring unit for acquiring priority program data which has a higher priority than the scheduled program data; a broadcasting unit for (a) continuously broadcasting the scheduled program data stored in the storing unit, (b) repeatedly broadcasting the related additional data and the unrelated additional data stored in the storing unit, and (c) stopping the broadcast of the scheduled program data and starting broadcasting the priority program data when the acquiring unit acquires the priority program data; and an instructing unit for having the broadcasting unit broadcast a switch instruction, the switch instruction instructing the reception apparatus to stop reproducing the related additional data and start reproducing the unrelated additional data when the broadcast of the scheduled program data is stopped.

With this construction, when the priority program data is acquired, the data broadcast apparatus not only stops broadcasting the scheduled program data and starts broadcasting the priority program data, but also broadcasts the switch instruction which instructs the reception apparatus to stop reproducing the related additional data and start reproducing the unrelated additional data.

Accordingly, the presentation of the related additional data to the viewer in the reception apparatus can be stopped instantly, without broadcasting insignificant broadcast data.

Here, the switch instruction may instruct the reception apparatus to stop reproducing the related additional data and start reproducing the unrelated additional data upon receiving the switch instruction, wherein the instructing unit has the broadcasting unit broadcast the switch instruction when the acquiring unit acquires the priority program data, so that the reception apparatus will stop reproducing the related additional data and start reproducing the unrelated additional data upon receiving the switch instruction.

With this construction, the data broadcast apparatus broadcasts the switch instruction which instructs the reception apparatus to stop reproducing the related additional data immediately, when the priority program data is acquired.

Accordingly, the reception apparatus stops presenting the related additional data to the viewer as soon as it receives the switch instruction.

Here, the switch instruction may be broadcast as an event message or a module that has a specific identifier.

With this construction, the switch instruction can be broadcast as an event message or a module having a specific identifier.

Here, the broadcasting unit may stop broadcasting the related additional data and start broadcasting an empty carousel corresponding to the related additional data, when the acquiring unit acquires the priority program data, wherein the switch instruction instructs the reception apparatus to stop reproducing the related additional data and start reproducing the unrelated additional data upon starting to receive the empty carousel, and the instructing unit has the broadcasting unit broadcast the switch instruction before the acquiring unit acquires the priority program data, so that the reception apparatus will stop reproducing the related additional data and start reproducing the unrelated additional data upon starting to receive the empty carousel.

With this construction, the data broadcast apparatus broadcasts the switch instruction which instructs the reception apparatus to stop reproducing the related additional data on receiving the empty carousel, before the priority program data is acquired.

Accordingly, the reception apparatus stops presenting the related additional data to the viewer as soon as it receives the empty carousel.

Here, the broadcasting unit may stop broadcasting the related additional data when the acquiring unit acquires the priority program data, wherein the switch instruction instructs the reception apparatus to stop reproducing the related additional data and start reproducing the unrelated additional data upon detecting that the reception apparatus no longer receives the related additional data, and the instructing unit has the broadcasting unit broadcast the switch instruction before the acquiring unit acquires the priority program data, so that the reception apparatus will stop reproducing the related additional data and start reproducing the unrelated additional data upon detecting that the reception apparatus no longer receives the related additional data.

With this construction, the data broadcast apparatus broadcasts the switch instruction which instructs the reception apparatus to stop reproducing the related additional data on detecting that the reception of the related additional data is stopped, before the priority program data is acquired.

Accordingly, the reception apparatus stops presenting the related additional data to the viewer as soon as it detects that the reception of the related additional data is stopped.

Here, the broadcasting unit may resume broadcasting the scheduled program data when the broadcast of the priority program data ends, wherein the instructing unit has the broadcasting unit broadcast a return instruction, the return instruction instructing the reception apparatus to stop reproducing the unrelated additional data and resume reproducing the related additional data when the broadcast of the priority program data ends.

With this construction, when the broadcast of the priority program data ends, the data broadcast apparatus broadcasts the return instruction which instructs the reception apparatus to stop reproducing the unrelated additional data and resume reproducing the related additional data.

Accordingly, the presentation of the related additional data to the viewer can be resumed instantly in the reception apparatus.

Here, the return instruction may instruct the reception apparatus to stop reproducing the unrelated additional data and resume reproducing the related additional data upon receiving the return instruction, wherein the instructing unit has the broadcasting unit broadcast the return instruction by attaching the return instruction to the unrelated additional data when the broadcast of the priority program data ends, so that the reception apparatus will stop reproducing the unrelated additional data and resume reproducing the related additional data upon receiving the return instruction.

With this construction, the data broadcast apparatus broadcasts the return instruction which instructs the reception apparatus to resume the reproduction of the related additional data immediately, when the broadcast of the priority program data ends.

Accordingly, the reception apparatus resumes presenting the related additional data to the viewer as soon as it receives the return instruction.

Here, the return instruction may be broadcast as an event message or a module that has a specific identifier.

With this construction, the return instruction can be broadcast as an event message or a module having a specific identifier.

Here, the broadcasting unit may stop broadcasting the related additional data and start broadcasting an empty carousel corresponding to the related additional data when the acquiring unit acquires the priority program data, and stop broadcasting the empty carousel and resume broadcasting the related additional data when the broadcast of the priority program data ends, wherein the return instruction instructs the reception apparatus to stop reproducing the unrelated additional data and resume reproducing the related additional data upon stopping receiving the empty carousel, and the instructing unit has the broadcasting unit broadcast the return instruction before the broadcast of the priority program data ends, so that the reception apparatus will stop reproducing the unrelated additional data and resume reproducing the related additional data upon stopping receiving the empty carousel.

With this construction, the data broadcast apparatus broadcasts the return instruction which instructs the reception apparatus to resume reproducing the related additional data on stopping the reception of the empty carousel, before the broadcast of the priority program data ends.

Accordingly, the reception apparatus resumes the presentation of the related additional data to the viewer as soon as the reception of the empty carousel is stopped.

Here, the broadcasting unit may stop broadcasting the related additional data when the acquiring unit acquires the priority program data, and resume broadcasting the related additional data when the broadcast of the priority program data ends, wherein the return instruction instructs the reception apparatus to stop reproducing the unrelated additional data and resume reproducing the related additional data upon detecting that the reception apparatus resumes receiving the related additional data, and the instructing unit has the broadcasting unit broadcast the return instruction before the broadcast of the priority program data ends, so that the reception apparatus will stop reproducing the unrelated additional data and resume reproducing the related additional data upon detecting that the reception apparatus resumes receiving the related additional data.

With this construction, the data broadcast apparatus broadcasts the return instruction which instructs the reception apparatus to resume the reproduction of the related additional data on detecting that the reception of the related additional data is resumed, before the broadcast of the priority program data ends.

Accordingly, the reception apparatus resumes presenting the related additional data to the viewer as soon as it detects that the reception of the related additional data is resumed.

The stated object can also be achieved by a data broadcast apparatus for continuously broadcasting program data, and repeatedly broadcasting additional data using a carousel method, to a reception apparatus which stores the additional data into a memory and reproduces the additional data stored in the memory, including: a storing unit for storing scheduled program data which is scheduled to be broadcast, related additional data which relates to the scheduled program data, and unrelated additional data which does not relate to the scheduled program data; an acquiring unit for acquiring priority program data which has a higher priority than the scheduled program data; a broadcasting unit for (a) continuously broadcasting the scheduled program data stored in the storing unit, (b) repeatedly broadcasting the related additional data and the unrelated additional data stored in the storing unit, and (c) stopping the broadcast of the scheduled program data and starting broadcasting the priority program data when the acquiring unit acquires the priority program data; and an instructing unit for having the broadcasting unit broadcast a disable instruction, the disable instruction instructing the reception apparatus to refrain from switching reproduction from the unrelated additional data to the related additional data when the broadcast of the scheduled program data is stopped.

With this construction, when the priority program data is acquired, the data broadcast apparatus not only stops broadcasting the scheduled program data and starts broadcasting the priority program data, but also broadcasts the disable instruction which instructs the reception apparatus to refrain from reproducing the related additional data.

Accordingly, the switching of reproduction from the unrelated additional data to the related additional data can be prohibited instantly in the reception apparatus.

Here, the disable instruction may instruct the reception apparatus to refrain from switching the reproduction from the unrelated additional data to the related additional data upon receiving the disable instruction, wherein the instructing unit has the broadcasting unit broadcast the disable instruction when the acquiring unit acquires the priority program data, so that the reception apparatus will refrain from switching the reproduction from the unrelated additional data to the related additional data upon receiving the disable instruction.

With this construction, the data broadcast apparatus broadcasts the disable instruction which instructs the reception apparatus to refrain from reproducing the related additional data immediately, when the priority program data is acquired.

Accordingly, the reception apparatus refrains from switching reproduction from the unrelated additional data to the related additional data, as soon as it receives the disable instruction.

Here, the disable instruction may be broadcast as an event message or a module that has a specific identifier.

With this construction, the disable instruction can be broadcast as an event message or a module having a specific identifier.

Here, the broadcasting unit may stop broadcasting the related additional data and start broadcasting an empty carousel corresponding to the related additional data, when the acquiring unit acquires the priority program data, wherein the disable instruction instructs the reception apparatus to refrain from switching the reproduction from the unrelated additional data to the related additional data upon starting to receive the empty carousel, and the instructing unit has the broadcasting unit broadcast the disable instruction before the acquiring unit acquires the priority program data, so that the reception apparatus will refrain from switching the reproduction from the unrelated additional data to the related additional data upon starting to receive the empty carousel.

With this construction, the data broadcast apparatus broadcasts the disable instruction which instructs the reception apparatus to refrain from reproducing the related additional data on receiving the empty carousel, before the priority program data is acquired.

Accordingly, the reception apparatus refrains from switching reproduction from the unrelated additional data to the related additional data, as soon as it receives the empty carousel.

Here, the broadcasting unit may stop broadcasting the related additional data when the acquiring unit acquires the priority program data, wherein the disable instruction instructs the reception apparatus to refrain from switching the reproduction from the unrelated additional data to the related additional data upon detecting that the reception apparatus no longer receives the related additional data, and the instructing unit has the broadcasting unit broadcast the disable instruction before the acquiring unit acquires the priority program data, so that the reception apparatus will refrain from switching the reproduction from the unrelated additional data to the related additional upon detecting that the reception apparatus no longer receives the related additional data.

With this construction, the data broadcast apparatus broadcasts the disable instruction which instructs the reception apparatus to refrain from reproducing the related additional data on detecting that the reception of the related additional data is stopped, before the priority program data is acquired.

Accordingly, the reception apparatus refrains from switching reproduction from the unrelated additional data to the related additional data, as soon as it detects that the reception of the related additional data is stopped.

The stated object can also be achieved by a computer program embodied on a computer readable medium for use with a computer and a storing device, for repeatedly broadcasting broadcast data using a carousel method to a reception apparatus which stores the broadcast data into a memory and reproduces the broadcast data stored in the memory, wherein the storing device stores first broadcast data and second broadcast data, the computer program including: a detecting step for detecting a reproduction stop event which prohibits the reception apparatus from reproducing the first broadcast data; a broadcasting step for (a) repeatedly broadcasting the first broadcast data and the second broadcast data stored in the storing device, and (b) stopping the broadcast of the first broadcast data when the detecting step detects the reproduction stop event; and an instructing step for broadcasting a switch instruction, the switch instruction instructing the reception apparatus to stop reproducing the first broadcast data and start reproducing the second broadcast data when the broadcast of the first broadcast data is stopped.

The stated object can also be achieved by a data broadcast method used in a data broadcast apparatus equipped with a storing device, for repeatedly broadcasting broadcast data using a carousel method to a reception apparatus which stores the broadcast data into a memory and reproduces the broadcast data stored in the memory, wherein the storing device stores first broadcast data and second broadcast data, the data broadcast method including: a detecting step for detecting a reproduction stop event which prohibits the reception apparatus from reproducing the first broadcast data; a broadcasting step for (a) repeatedly broadcasting the first broadcast data and the second broadcast data stored in the storing device, and (b) stopping the broadcast of the first broadcast data when the detecting step detects the reproduction stop event; and an instructing step for broadcasting a switch instruction, the switch instruction instructing the reception apparatus to stop reproducing the first broadcast data and start reproducing the second broadcast data when the broadcast of the first broadcast data is stopped.

With these constructions, when the reproduction stop event is detected, not only the broadcast of the first broadcast data is stopped, but also the switch instruction which instructs the reception apparatus to stop reproducing the first broadcast data and start reproducing the second broadcast data is broadcast.

Accordingly, the presentation of the first broadcast data to the viewer in the reception apparatus can be stopped instantly, without broadcasting insignificant broadcast data.

Here, after detecting the reproduction stop event, the detecting step may detect a reproduction resume event which permits the reception apparatus to reproduce the first broadcast data, wherein the broadcasting step resumes broadcasting the first broadcast data when the detecting step detects the reproduction resume event, and the instructing step broadcasts a return instruction, the return instruction instructing the reception apparatus to stop reproducing the second broadcast data and resume reproducing the first broadcast data when the broadcast of the first broadcast data is resumed.

With this construction, when the reproduction resume event is detected, not only the broadcast of the first broadcast data is resumed, but also the return instruction which instructs the reception apparatus to stop reproducing the second broadcast data and start reproducing the first broadcast data is broadcast.

Accordingly, the presentation of the first broadcast data to the viewer can be resumed instantly in the reception apparatus.

The stated object can also be achieved by a computer program embodied on a computer readable medium for use with a computer and a storing device, for repeatedly broadcasting broadcast data using a carousel method to a reception apparatus which stores the broadcast data into a memory and reproduces the broadcast data stored in the memory, wherein the storing device stores first broadcast data and second broadcast data, the computer program including: a detecting step for detecting a reproduction stop event which prohibits the reception apparatus from reproducing the first broadcast data; a broadcasting step for (a) repeatedly broadcasting the first broadcast data and the second broadcast data stored in the storing device, and (b) stopping the broadcast of the first broadcast data when the detecting step detects the reproduction stop event; and an instructing step for broadcasting a disable instruction, the disable instruction instructing the reception apparatus to refrain from switching reproduction from the second broadcast data to the first broadcast data when the broadcast of the first broadcast data is stopped.

The stated object can also be achieved by a data broadcast method used in a data broadcast apparatus equipped with a storing device, for repeatedly broadcasting broadcast data using a carousel method to a reception apparatus which stores the broadcast data into a memory and reproduces the broadcast data stored in the memory, wherein the storing device stores first broadcast data and second broadcast data, the data broadcast method including: a detecting step for detecting a reproduction stop event which prohibits the reception apparatus from reproducing the first broadcast data; a broadcasting step for (a) repeatedly broadcasting the first broadcast data and the second broadcast data stored in the storing device, and (b) stopping the broadcast of the first broadcast data when the detecting step detects the reproduction stop event; and an instructing step for broadcasting a disable instruction, the disable instruction instructing the reception apparatus to refrain from switching reproduction from the second broadcast data to the first broadcast data when the broadcast of the first broadcast data is stopped.

With these constructions, when the reproduction stop event is detected, not only the broadcast of the first broadcast data is stopped, but also the disable instruction which instructs the reception apparatus to refrain from switching the reproduction from the second broadcast data to the first broadcast data is broadcast.

Accordingly, the switching of reproduction from the second broadcast data to the first broadcast data can be prohibited instantly in the reception apparatus.

The stated object can also be achieved by a computer program embodied on a computer readable medium for use with a computer and a storing device, for continuously broadcasting program data, and repeatedly broadcasting additional data using a carousel method, to a reception apparatus which stores the additional data into a memory and reproduces the additional data stored in the memory, wherein the storing device stores scheduled program data which is scheduled to be broadcast, related additional data which relates to the scheduled program data, and unrelated additional data which does not relate to the scheduled program data, the computer program including: an acquiring step for acquiring priority program data which has a higher priority than the scheduled program data; a broadcasting step for (a) continuously broadcasting the scheduled program data stored in the storing device, (b) repeatedly broadcasting the related additional data and the unrelated additional data stored in the storing device, and (c) stopping the broadcast of the scheduled program data and starting broadcasting the priority program data when the acquiring step acquires the priority program data; and an instructing step for broadcasting a switch instruction, the switch instruction instructing the reception apparatus to stop reproducing the related additional data and start reproducing the unrelated additional data when the broadcast of the scheduled program data is stopped.

The stated object can also be achieved by a data broadcast method used in a data broadcast apparatus equipped with a storing device, for continuously broadcasting program data, and repeatedly broadcasting additional data using a carousel method, to a reception apparatus which stores the additional data into a memory and reproduces the additional data stored in the memory, wherein the storing device stores scheduled program data which is scheduled to be broadcast, related additional data which relates to the scheduled program data, and unrelated additional data which does not relate to the scheduled program data, the data broadcast method including: an acquiring step for acquiring priority program data which has a higher priority than the scheduled program data; a broadcasting step for (a) continuously broadcasting the scheduled program data stored in the storing device, (b) repeatedly broadcasting the related additional data and the unrelated additional data stored in the storing device, and (c) stopping the broadcast of the scheduled program data and starting broadcasting the priority program data when the acquiring step acquires the priority program data; and an instructing step for broadcasting a switch instruction, the switch instruction instructing the reception apparatus to stop reproducing the related additional data and start reproducing the unrelated additional data when the broadcast of the scheduled program data is stopped.

With these constructions, when the priority program data is acquired, not only the broadcast of the scheduled program data is stopped and the broadcast of the priority program data is started, but also the switch instruction which instructs the reception apparatus to stop reproducing the related additional data and start reproducing the unrelated additional data is broadcast.

Accordingly, the presentation of the related additional data to the viewer in the reception apparatus can be stopped instantly, without broadcasting insignificant broadcast data.

Here, the broadcasting step may resume broadcasting the scheduled program data when the broadcast of the priority program data ends, wherein the instructing step broadcasts a return instruction, the return instruction instructing the reception apparatus to stop reproducing the unrelated additional data and resume reproducing the related additional data when the broadcast of the priority program data ends.

With this construction, when the broadcast of the priority program data ends, the return instruction which instructs the reception apparatus to stop reproducing the unrelated additional data and resume reproducing the related additional data is broadcast.

Accordingly, the presentation of the related additional data to the viewer can be resumed instantly in the reception apparatus.

The stated object can also be achieved by a computer program embodied on a computer readable medium for use with a computer and a storing device, for continuously broadcasting program data, and repeatedly broadcasting additional data using a carousel method, to a reception apparatus which stores the additional data into a memory and reproduces the additional data stored in the memory, wherein the storing device stores scheduled program data which is scheduled to be broadcast, related additional data which relates to the scheduled program data, and unrelated additional data which does not relate to the scheduled program data, the computer program including: an acquiring step for acquiring priority program data which has a higher priority than the scheduled program data; a broadcasting step for (a) continuously broadcasting the scheduled program data stored in the storing device, (b) repeatedly broadcasting the related additional data and the unrelated additional data stored in the storing device, and (c) stopping the broadcast of the scheduled program data and starting broadcasting the priority program data when the acquiring step acquires the priority program data; and an instructing step for broadcasting a disable instruction, the disable instruction instructing the reception apparatus to refrain from switching reproduction from the unrelated additional data to the related additional data when the broadcast of the scheduled program data is stopped.

The stated object can also be achieved by a data broadcast method used in a data broadcast apparatus equipped with a storing device, for continuously broadcasting program data, and repeatedly broadcasting additional data using a carousel method, to a reception apparatus which stores the additional data into a memory and reproduces the additional data stored in the memory, wherein the storing device stores scheduled program data which is scheduled to be broadcast, related additional data which relates to the scheduled program data, and unrelated additional data which does not relate to the scheduled program data, the data broadcast method including: an acquiring step for acquiring priority program data which has a higher priority than the scheduled program data; a broadcasting step for (a) continuously broadcasting the scheduled program data stored in the storing device, (b) repeatedly broadcasting the related additional data and the unrelated additional data stored in the storing device, and (c) stopping the broadcast of the scheduled program data and starting broadcasting the priority program data when the acquiring step acquires the priority program data; and an instructing step for broadcasting a disable instruction, the disable instruction instructing the reception apparatus to refrain from switching reproduction from the unrelated additional data to the related additional data when the broadcast of the scheduled program data is stopped.

With these constructions, when the priority program data is acquired, not only the broadcast of the scheduled program data is stopped and the broadcast of the priority program data is started, but also the disable instruction which instructs the reception apparatus to refrain from reproducing the related additional data is broadcast.

Accordingly, the switching of reproduction from the unrelated additional data to the related additional data can be prohibited instantly in the reception apparatus.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 7 shows an example of a data stream outputted from the broadcast apparatus;

FIG. 8 shows an example transition of displays on a TV when a reception apparatus shown in FIG. 1 receives the data stream shown in FIG. 7;

FIG. 9 shows an example of a data stream outputted from the broadcast apparatus when an empty carousel is used; and FIG. 10 shows an example of a data stream outputted from the broadcast apparatus when an empty carousel is used only for a switch instruction.

DESCRIPTION OF THE PREFERRED EMBODIMENT(S)

Embodiment
(Overview)

In an embodiment of the present invention, a broadcast apparatus broadcasts a switch instruction to switch from additional data which is being reproduced to other additional data so that a reception apparatus instantly stops reproducing the additional data.

The broadcast apparatus also broadcasts a disable instruction to disable a link contained in the other additional data to the additional data, at the same time as the switch instruction.

The broadcast apparatus also broadcasts a return instruction to stop the reproduction of the other additional data and resume the reproduction of the additional data.

The broadcast apparatus further broadcasts an enable instruction to enable the link contained in the other additional data to the additional data, at the same time as the return instruction.

(Construction)

Figure 1:
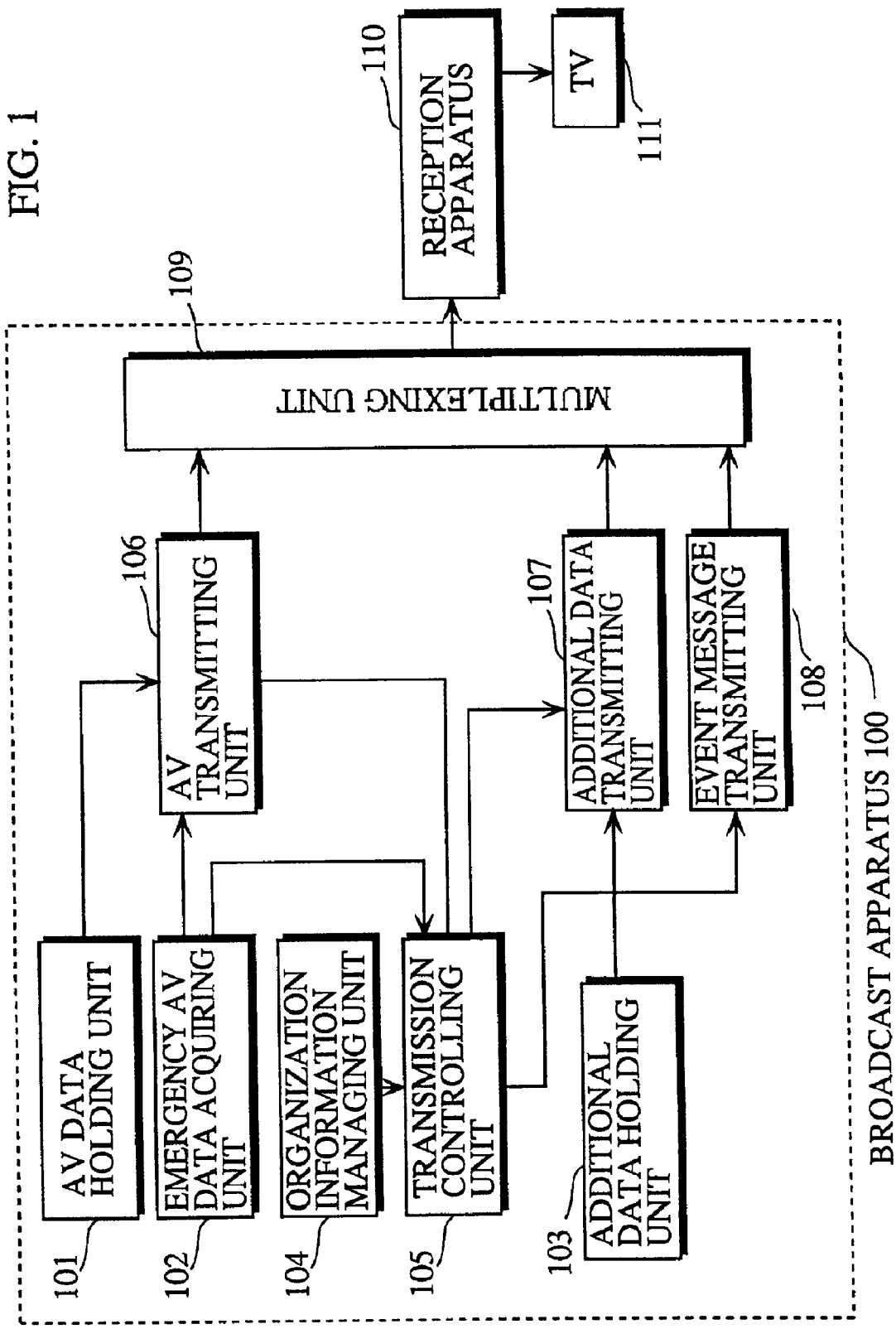
FIG. 1 is a block diagram showing a construction of a broadcast system according to an embodiment of the invention.

FIG. 1 is a block diagram showing a construction of a broadcast system according to the embodiment of the invention.

The broadcast system shown in FIG. 1 is roughly made up of a broadcast apparatus 100 and a reception apparatus 110.

The drawing also shows a TV 111 for presenting programs and data to a viewer based on a data broadcast received by the reception apparatus 110.

The broadcast apparatus 100 includes an AV data holding unit 101, an emergency AV data acquiring unit 102, an additional data holding unit 103, an organization information managing unit 104, a transmission controlling unit 105, an AV transmitting unit 106, an additional data transmitting unit 107, an event message transmitting unit 108, and a multiplexing unit 109.

The AV data holding unit 101 can be implemented by a commercially available VCR or video server, and holds image and audio data (hereafter collectively called "AV data") of a scheduled program.

Figure 2:
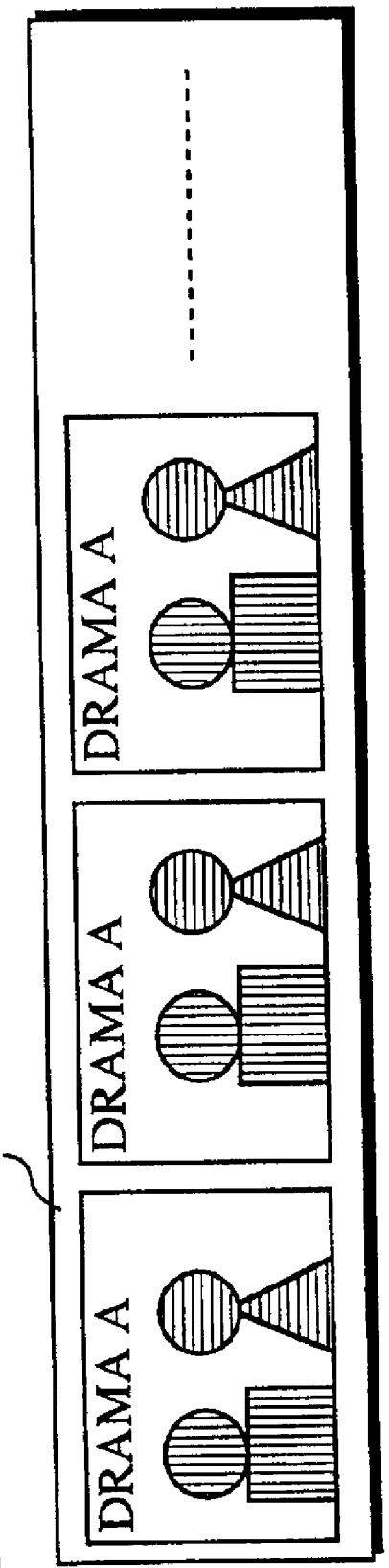
FIG. 2 shows an example of AV data held in an AV data holding unit shown in FIG. 1.

FIG. 2 shows an example of AV data held in the AV data holding unit 101.

In FIG. 2, a drama A image 201 is AV data used for a scheduled program titled "drama A".

The emergency AV data acquiring unit 102 unexpectedly acquires AV data of an emergency program, such as a disaster warning or an important news flash, that takes precedence over other programs.

Figure 3:
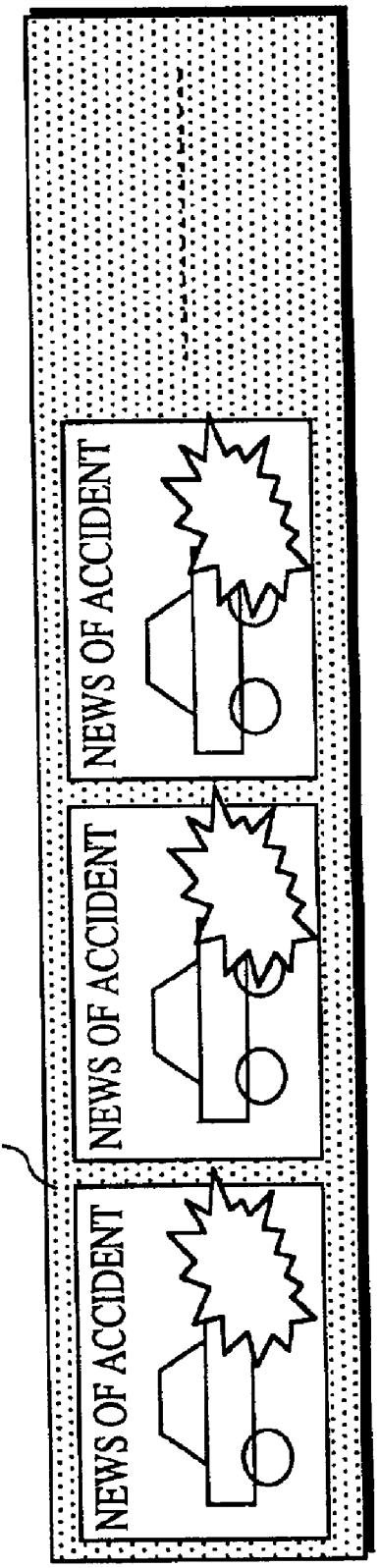
FIG. 3 shows an example of emergency AV data acquired by an emergency AV data acquiring unit shown in FIG. 1.

FIG. 3 shows an example of emergency AV data acquired by the emergency AV data acquiring unit 102.

In FIG. 3, an emergency image 301 is emergency AV data informing of the occurrence of an accident.

The additional data holding unit 103 can be implemented with a commercially available VCR or video server, and holds additional data. The additional data held here can be classified into additional data which relates to the scheduled program (related additional data) and additional data which does not relate to the scheduled program (unrelated additional data).

Figure 4:
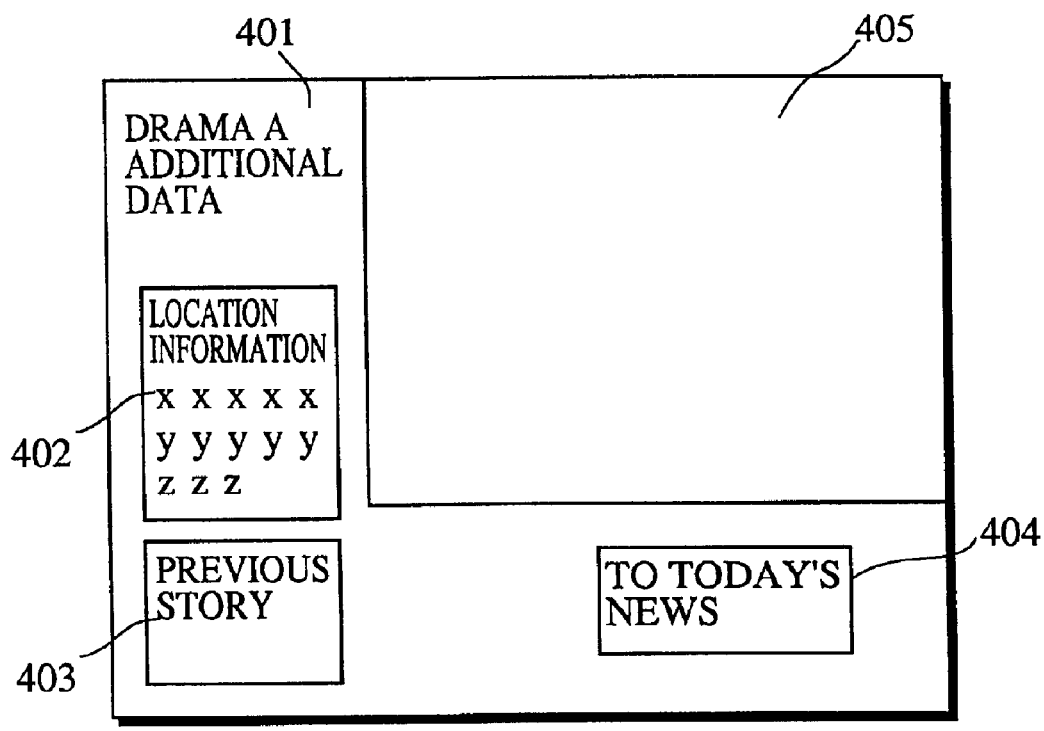
FIGS. 4 and 5 show examples of additional data held in an additional data holding unit shown in FIG. 1.
Figure 5:
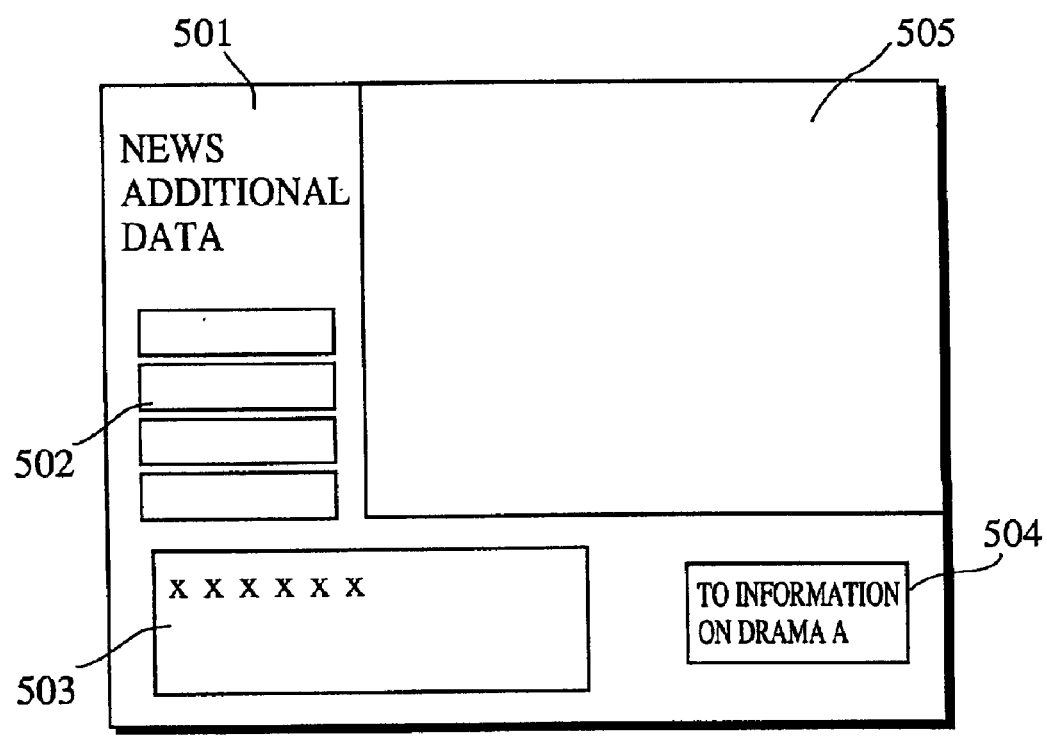

FIGS. 4 and 5 show examples of additional data held in the additional data holding unit 103.

In FIG. 4, drama A additional data 401 is additional data related to the scheduled program "drama A" (i.e. related additional data).

The drama A additional data 401 includes detailed information about the program "drama A", such as location information 402 on the location of the program "drama A" and story information 403 on the previous story of the program "drama A". A button 404 is a button which provides a link to additional data relating to today's news. The viewer can switch the display to the additional data relating to today's news, by selecting the button 404 using a remote control or the like. A display region 405 is used to display the program "drama A".

In FIG. 5, news additional data 501 is the additional data relating to today's news (i.e. unrelated additional data).

The news additional data 501 includes information showing today's news, such as news headlines 502 and news contents 503. A button 504 is a button which provides a link to the additional data related to the program "drama A" (related additional data). The viewer can switch the display to the additional data related to the program "drama A", by selecting the button 504 using a remote control or the like. A display region 505 is used to display the program "drama A".

The organization information managing unit 104 is equipped with a storage medium such as a memory or an HDD for storing organization information about programs which are scheduled for broadcasting, and an I/O terminal for reading/writing organization information by organizers. For instance, a management table which associates a broadcast start time, a broadcast end time, an AV data name, and an additional data name is held in the organization information managing unit 104.

The transmission controlling unit 105 has a clock. With reference to the organization information managed in the organization information managing unit 104, the transmission controlling unit 105 manages operation timings of and issues instructions to the AV transmitting unit 106, the additional data transmitting unit 107, and the event message transmitting unit 108, thereby controlling the operation of the entire apparatus 100.

More specifically, with reference to the management table in the organization information managing unit 104, the transmission controlling unit 105 passes a name of AV data of a scheduled program to the AV transmitting unit 106 and instructs the AV transmitting unit 106 to start transmitting the AV data, at a broadcast start time of the scheduled program. The transmission controlling unit 105 then instructs the AV transmitting unit 106 to stop transmitting the AV data at a broadcast end time of the scheduled program. Also, the transmission controlling unit 105 passes a name of additional data to the additional data transmitting unit 107 and instructs the additional data transmitting unit 107 to start transmitting the additional data, at a broadcast start time of the additional data. The transmission controlling unit 105 then instructs the additional data transmitting unit 107 to stop transmitting the additional data, at a broadcast end time of the additional data.

Here, if the emergency AV data acquiring unit 102 acquires emergency AV data while the scheduled program is being broadcast, the transmission controlling unit 105 instructs the AV transmitting unit 106 to stop transmitting the AV data of the scheduled program, and start transmitting the emergency AV data. The transmission controlling unit 105 also instructs the additional data transmitting unit 107 to stop transmitting additional data related to the scheduled program. Further, the transmission controlling unit 105 instructs the event message transmitting unit 108 to transmit a switch instruction which instructs the reception apparatus 110 to stop reproducing the additional data related to the scheduled program and instead reproduce additional data unrelated to the scheduled program. The transmission controlling unit 105 also instructs the event message transmitting unit 108 to transmit a disable instruction which instructs the reception apparatus 110 to disable a link contained in the unrelated additional data to the related additional data.

When the broadcast of the emergency AV data ends, the transmission controlling unit 105 instructs the AV transmitting unit 106 to resume transmitting the AV data of the scheduled program, and instructs the additional data transmitting unit 107 to resume transmitting the related additional data. The transmission controlling unit 105 also instructs the event message transmitting unit 108 to transmit a return instruction which indicates to the reception apparatus 110 to stop reproducing the unrelated additional data and instead reproduce the related additional data. The transmission controlling unit 105 further instructs the event message transmitting unit 108 to transmit an enable instruction which indicates to the reception apparatus 110 to enable the link contained in the unrelated additional data to the related additional data.

The AV transmitting unit 106 reads the AV data of the scheduled program from the AV data holding unit 101 and passes it to the multiplexing unit 109, or receives the emergency AV data from the emergency AV data acquiring unit 102 and passes it to the multiplexing unit 109, in accordance with the instructions from the transmission controlling unit 105.

The additional data transmitting unit 107 reads the additional data from the additional data holding unit 103 and passes it to the multiplexing unit 109, in accordance with the instructions from the transmission controlling unit 105.

The event message transmitting unit 108 generates event messages showing the above instructions and passes them to the multiplexing unit 109, in accordance with the instructions from the transmission controlling unit 105.

An event message referred to here is a small amount of message information that is used by the broadcast apparatus 100 to instruct application software operating in the reception apparatus 110 to execute a particular event at once or at a specified time.

Here, the correspondence between message IDs and events is defined in the application software in the reception apparatus 110 beforehand, so that the reception apparatus 110 executes an event such as switching reproduction of additional data or disabling a link to additional data, based on a message ID included in a received event message.

A message ID is an identifier of an event message generated by the event message transmitting unit 108.

Defining an event can be done by writing the contents of the event using a script language. The details on event messages and script language descriptions are described in the ARIB STD-B24 specification "Data Broadcast Coding and Transmission in Digital Broadcasting".

In this embodiment, events such as the following are defined in advance as operations of the reception apparatus 110 when receiving event messages: stopping the reproduction of the drama A additional data 401 and starting the reproduction of the news additional data 501; stopping the reproduction of the news additional data 501 and resuming the reproduction of the drama A additional data 401; disabling the link to the drama A additional data 401 in the news additional data 501; and enabling the link to the drama A additional data 401 in the news additional data 501.

The multiplexing unit 109 multiplexes the AV data of the scheduled program or the emergency AV data passed from the AV transmitting unit 106, the additional data passed from the additional data transmitting unit 107, and the event messages passed from the event message transmitting unit 108, to generate a data stream. The multiplexing unit 109 broadcasts the data stream to the reception apparatus 110.

The multiplexing unit 109 can be implemented by a transport stream multiplexing device used in general digital satellite broadcasting, or software having the same functions as the multiplexing device.

The reception apparatus 110 receives the data stream broadcast by the broadcast apparatus 100, and displays a program of the AV data multiplexed in the data stream on the TV 111. The reception apparatus 110 also displays the additional data multiplexed in the data stream on the TV 111, while performing operations such as switching the display of the additional data in accordance with the event messages multiplexed in the data stream.

(Operation)

The following is an explanation on a broadcast operation of the broadcast apparatus 100 in this embodiment.

Figure 6:
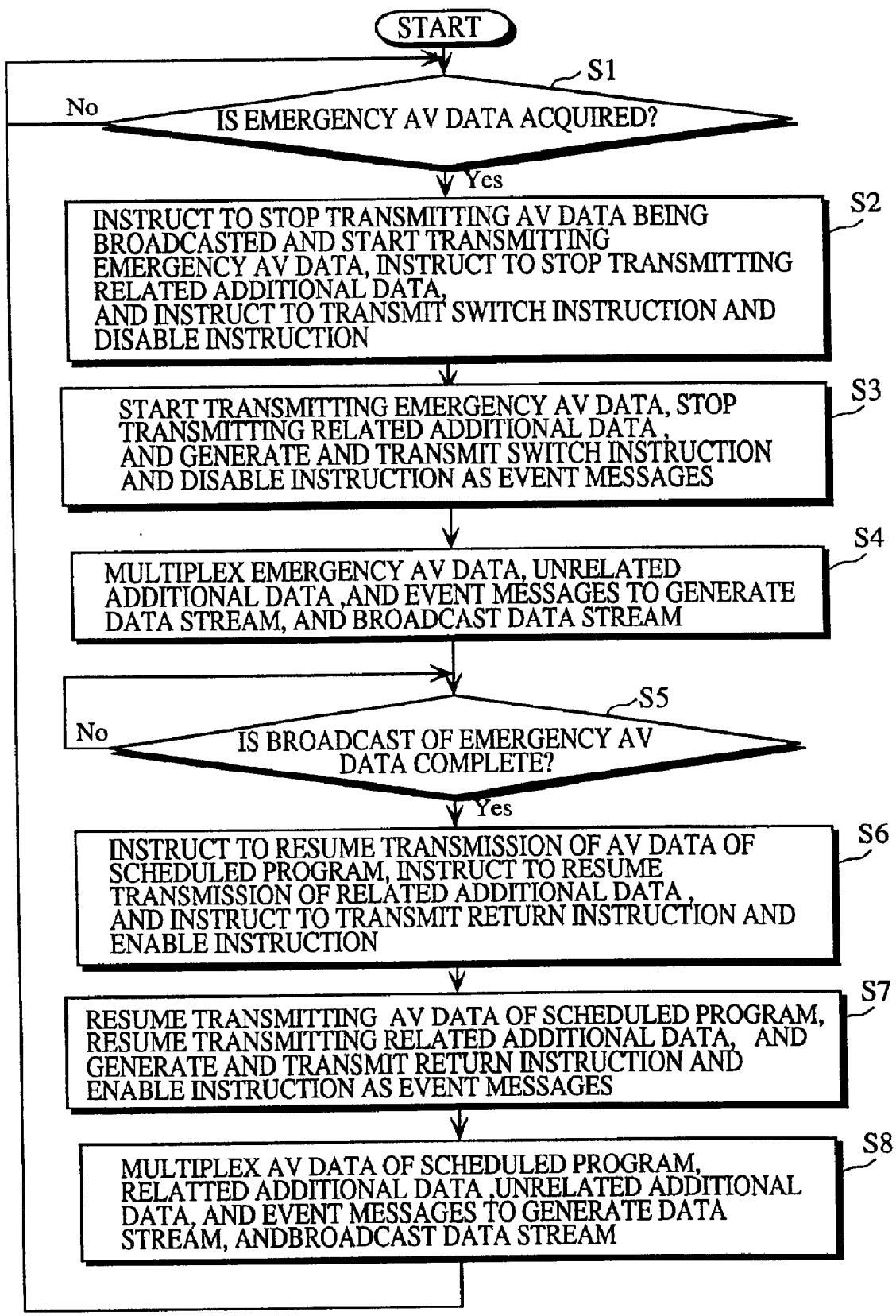
FIG. 6 is a flowchart showing a transmission operation by a broadcast apparatus shown in FIG. 1.

FIG. 6 is a flowchart showing a transmission operation of the broadcast apparatus 100.

Suppose a data stream in which the drama A image 201, the drama A additional data 401, and the news additional data 501 are multiplexed is being broadcast in accordance with the management table managed in the organization information managing unit 104.

(1) The transmission controlling unit 105 waits until the emergency AV data acquiring unit 102 acquires emergency AV data (S1).

In the present example, the emergency AV data acquiring unit 102 acquires the emergency image 301 at time T1.

(2) When the emergency AV data acquiring unit 102 acquires the emergency AV data, the transmission controlling unit 105 instructs the AV transmitting unit 106 to stop transmitting AV data of a scheduled program which is being broadcast, and start transmitting the emergency AV data. The transmission controlling unit 105 also instructs the additional data transmitting unit 107 to stop transmitting additional data related to the scheduled program. The transmission controlling unit 105 further instructs the event message transmitting unit 108 to transmit a switch instruction which indicates to the reception apparatus 110 to stop reproducing the related additional data and instead reproduce additional data unrelated to the scheduled program, and a disable instruction which indicates to the reception apparatus 110 to disable a link to the related additional data in the unrelated additional data (S2).

In the present example, the transmission controlling unit 105 instructs the AV transmitting unit 106 to stop the transmission of the drama A image 201 and start transmitting the emergency image 301, and instructs the additional data transmitting unit 107 to stop the transmission of the drama A additional data 401. Also, the transmission controlling unit 105 instructs the event message transmitting unit 108 to transmit a switch instruction which indicates to stop the reproduction of the drama A additional data 401 and instead reproduce the news additional data 501, and a disable instruction which indicates to disable a link to the drama A additional data 401 in the news additional data 501.

(3) In accordance with the instructions from the transmission controlling unit 105, the AV transmitting unit 106 passes the emergency AV data acquired by the emergency AV data acquiring unit 102 to the multiplexing unit 109, instead of the AV data of the scheduled program held in the AV data holding unit 101. Also, the additional data transmitting unit 107 stops the transmission of the related additional data. Also, the event message transmitting unit 108 generates the switch instruction and the disable instruction and passes them to the multiplexing unit 109 as event messages (S3).

In the present example, the AV transmitting unit 106 passes the emergency image 301 to the multiplexing unit 109 instead of the drama A image 201. The additional data transmitting unit 107 stops the transmission of the drama A additional data 401. The event message transmitting unit 108 generates the switch instruction which indicates to stop the reproduction of the drama A additional data 401 and instead reproduce the news additional data 501, and the disable instruction which indicates to disable the link to the drama A additional data 401 in the news additional data 501. The event message transmitting unit 108 passes these instructions to the multiplexing unit 109 as event messages.

(4) The multiplexing unit 109 multiplexes the emergency AV data passed from the AV transmitting unit 106, the unrelated additional data passed from the additional data transmitting unit 107, and the event messages passed from the event message transmitting unit 108, to generate a data stream. The multiplexing unit 109 then broadcasts the data stream to the reception apparatus 110 (S4).

In the present example, the multiplexing unit 109 multiplexes the emergency image 301, the news additional data 501, and the event messages to generate a data stream, and broadcasts the data stream.

(5) The transmission controlling unit 105 waits until the broadcast of the emergency AV data ends (S5).

In the present example, the broadcast of the emergency image 301 ends at time T2.

(6) When the broadcast of the emergency AV data ends, the transmission controlling unit 105 instructs the AV transmitting unit 106 to resume the transmission of the AV data of the scheduled program, and instructs the additional data transmitting unit 107 to resume the transmission of the related additional data. The transmission controlling unit 105 also instructs the event message transmitting unit 108 to transmit a return instruction which indicates to the reception apparatus 110 to stop reproducing the unrelated additional data and instead reproduce the related additional data, and an enable instruction which indicates to the reception apparatus 110 to enable the link to the related additional data in the unrelated additional data (S6).

In the present example, the transmission controlling unit 105 instructs the AV transmitting unit 106 to resume the transmission of the drama A image 201, and instructs the additional data transmitting unit 107 to resume the transmission of the drama A additional data 401. The transmission controlling unit 105 also instructs the event message transmitting unit 108 to transmits a return instruction which indicates to stop the reproduction of the news additional data 501 and instead reproduce the drama A additional data 401, and an enable instruction which indicates to enable the link to the drama A additional data 401 in the news additional data 501.

(7) In accordance with the instructions from the transmission controlling unit 105, the AV transmitting unit 106 passes the AV data of the scheduled program held in the AV data holding unit 101, to the multiplexing unit 109. Also, the additional data transmitting unit 107 resumes the transmission of the related additional data. Also, the event message transmitting unit 108 generates the return instruction and the enable instruction, and passes them to the multiplexing unit 109 as event messages (S7).

In the present example, the AV transmitting unit 106 passes the drama A image 201 to the multiplexing unit 109, and the additional data transmitting unit 107 resumes the transmission of the drama A additional data 401. Also, the event message transmitting unit 108 generates the return instruction which indicates to stop the reproduction of the news additional data 501 and instead reproduce the drama A additional data 401, and the enable instruction which indicates to enable the link to the drama A additional data 401 in the news additional data 501. The event message transmitting unit 108 passes these instructions to the multiplexing unit 109 as event messages.

(8) The multiplexing unit 109 multiplexes the AV data of the scheduled program passed from the AV transmitting unit 106, the related additional data and the unrelated additional data passed from the additional data transmitting unit 107, and the event messages passed from the event message transmitting unit 108, to generate a data stream. The multiplexing unit 109 broadcasts the data stream to the reception apparatus 110 (S8).

In the present example, the multiplexing unit 109 multiplexes the drama A image 201, the drama A additional data 401, the news additional data 501, and the event messages to generate a data stream.

EXAMPLE

FIG. 7 shows a specific example of a data stream outputted from the broadcast apparatus 100 in this embodiment.

In a data stream 700 shown in FIG. 7, the upper part is an AV data stream 701, the middle part is a related additional data stream 702, and the lower part is an unrelated additional data stream 703.

An arrow 710 is a time axis, indicating the passage of time from left to right.

In the AV data stream 701, the drama A image 201 is transmitted before time T1, and the emergency image 301 is transmitted from time T1. At time T2, the transmission of the drama A image 201 is resumed.

In the related additional data stream 702, the drama A additional data 401 is transmitted before time T1, which is stopped at time T1. At time T2, the transmission of the drama A additional data 401 is resumed. Also, an event message 704 showing a switch instruction is transmitted from time T1.

In the unrelated additional data stream 703, the news additional data 501 is transmitted irrespective of times T1 and T2. Also, an event message 705 showing a disable instruction is transmitted from time T1, and an event message 706 showing a return instruction and an enable instruction is transmitted from time T2.

It should be noted that in FIG. 7 each of the event messages 704, 705, and 706 is transmitted three times in case where the reception apparatus 110 fails to receive it, but the number of times the event message is transmitted is not limited to such.

FIG. 8 shows a transition of displays on the TV 111 when the reception apparatus 110 receives the data stream 700 shown in FIG. 7.

An operation of the reception apparatus 110 when the data stream 700 is received is explained below, with reference to FIG. 8.

(1) Before time T1, the reception apparatus 110 starts receiving the data stream 700, displays the drama A image 201 in the AV data stream 701 in the upper right display region on the TV 111, and displays the drama A additional data 401 in the related additional data stream 702 in the lower left L-shaped display region on the TV 111, as shown in a display 801.

(2) At time T1, the reception apparatus 110 displays the emergency image 301 in the AV data stream 701 in the upper right display region on the TV 111. At the same time, the reception apparatus 110 receives the event message 704, and displays the news additional data 501 in the unrelated additional data stream 703 in the lower left L-shaped display region on the TV 111. The reception apparatus 110 also receives the event message 705, and disables the button 504 providing a link to the drama A additional data 401 so that the frame of the button 504 becomes dotted lines, as shown in a display 802.

(3) At time T2, the reception apparatus 110 displays the drama A image 201 in the AV data stream 701 in the upper right display region on the TV 111. At the same time, the reception apparatus 110 receives the event message 706, displays the drama A additional data 401 in the related additional data stream 702 in the lower left L-shaped display region on the TV 111, and enables the link to the drama A additional data 401 in the news additional data 501, as shown in the display 801.

According to the embodiment of the invention, the broadcast apparatus 100 broadcasts a switch instruction when the reproduction of AV data and additional data of a scheduled program which is being broadcast needs to be stopped because of an interruption by an emergency program. On receiving the switch instruction, the reception apparatus 110 immediately stops the reproduction of the additional data related to the scheduled program and instead reproduces additional data unrelated to the scheduled program. Thus, the presentation of the related additional data to the viewer can be stopped instantly without broadcasting insignificant additional data such as a trouble slide.

Also, the broadcast apparatus 100 broadcasts a disable instruction. On receiving the disable instruction, the reception apparatus 110 disables a link from the unrelated additional data to the related additional data, with it being possible to prohibit the viewer from selecting the reproduction of the related additional data during the broadcast of the emergency program.

Also, the broadcast apparatus 100 broadcasts a return instruction when the broadcast of the emergency program ends and the AV data of the scheduled program and the related additional data need to be resumed. On receiving the return instruction, the reception apparatus 110 immediately stops the reproduction of the unrelated additional data and resumes the reproduction of the related additional data. Thus, the presentation of the related additional data to the viewer can be resumed instantly.

Also, the broadcast apparatus 100 broadcasts an enable instruction. On receiving the enable instruction, the reception apparatus 110 enables the link from the unrelated additional data to the related additional data, with it being possible to allow the viewer to select the reproduction of the related additional data.

The above embodiment describes the case where additional data related to a program which is being broadcast is instantly stopped when emergency news occurs. However, the invention can be applied to any case where reproduction of data which has been received and stored in a memory by a reception apparatus need be stopped immediately, such as when the contents of data are found to be inappropriate or erroneous, or when some kind of failure occurs in a broadcast apparatus or a reception apparatus.

The above embodiment describes the case where each instruction is broadcast when it needs to be executed, but this is not a limit for the invention. For example, the broadcast apparatus 100 may transmit a program written in a script language or the like beforehand that describes the procedure of performing switch and disable operations when the reception apparatus 110 starts receiving an empty carousel instead of the related additional data, and broadcast the empty carousel instead of the related additional data when the broadcast apparatus 100 wants the reception apparatus 110 to immediately stop reproducing the related additional data. Also, the broadcast apparatus 100 may transmit a program written in a script language or the like beforehand that describes the procedure of performing return and enable operations when the reception apparatus 110 starts receiving the related additional data instead of the empty carousel, and broadcasts the related additional data instead of the empty carousel when the broadcast apparatus 110 wants the reception apparatus 110 to resume the reproduction of the related additional data. As a result, the same functions as the above embodiment can be achieved.

An empty carousel is carousel data which has no real content, so that the reception apparatus 110 can instantly detect the change from additional data to an empty carousel and vice versa.

For details on empty carousels and script language descriptions, see the ARIB STD-B24 specification "Data Broadcast Coding and Transmission in Digital Broadcasting".

FIG. 9 shows a specific example of a data stream outputted from the broadcast apparatus 100 when an empty carousel is used.

In a data stream 900 shown in FIG. 9, the upper part is an AV data stream 901, the middle part is a related additional data stream 902, and the lower part is an unrelated additional data stream 903.

An arrow 910 is a time axis, showing the passage of time from left to right.

In the AV data stream 901, the drama A image 201 is transmitted before time T1, and the emergency image 301 is transmitted from time T1. From time T2, the transmission of the drama A image 201 is resumed.

In the related additional data stream 902, the drama A additional data 401 is transmitted before time T1, which is changed to an empty carousel 904 at time T1. From time T2, the transmission of the drama A additional data 401 is resumed. Also, a program 905 indicating to the reception apparatus 110 to execute a switch operation on detecting the change from the drama A additional data 401 to the empty carousel 904 is transmitted before time T1 and after time T2.

In the unrelated additional data stream 903, the news additional data 501 is transmitted irrespective of times T1 and T2. Also, a program 907 indicating to the reception apparatus 110 to execute a disable operation on detecting the change from the drama A additional data 401 to the empty carousel 904 is transmitted before time T1 and after time T2. Further, a program 907 indicating to the reception apparatus 110 to execute return and enable operations on detecting the change from the empty carousel 904 to the drama A additional data 401 is transmitted between times T1 and T2.

Alternatively, the instructions may be issued in different ways. For instance, the broadcast apparatus 100 may issue the switch instruction beforehand through the use of an empty carousel, and issue each of the other instructions when the broadcast apparatus 100 wants the reception apparatus 110 to execute it.

FIG. 10 shows a specific example of a data stream outputted from the broadcast apparatus 100 when an empty carousel is used only to indicate a switch operation.

In a data stream 1000 shown in FIG. 10, the upper part is an AV data stream 1001, the middle part is a related additional data stream 1002, and the lower part is an unrelated additional data stream 1003.

An arrow 1010 is a time axis, showing the passage of time from left to right.

In the AV data stream 1001, the drama A image 201 is transmitted before time T1, and the emergency image 301 is transmitted from time T1. Form time T2, the transmission of the drama A image 201 is resumed.

In the related additional data stream 1002, the drama A additional data 401 is transmitted before time T1, which is changed to an empty carousel 1004 at time T1. From time T2, the transmission of the drama A additional data 401 is resumed. Also, a program 1005 indicating to the reception apparatus 110 to execute a switch operation on detecting the change from the drama A additional data 401 to the empty carousel 1004 is transmitted before time T1 and after time T2.

In the unrelated additional data stream 1003, the news additional data 501 is transmitted irrespective of times T1 and T2. Also, an event message 1006 showing a disable instruction is transmitted from time T1. Further, an event message 1007 showing return and enable instructions is transmitted from time T2.

Alternatively, dummy additional data indicating to reproduce unrelated additional data may be transmitted between times T1 and T2, instead of the drama A additional data 401.

Such dummy additional data can be created as a program written in a script language or similar.

The above embodiment describes the case where the switch, disable, return, and enable instructions are broadcast using event messages, but they may be broadcast using modules having specific identifiers.

A module referred to here denotes a predetermined amount of data that is a data unit of carousel data. When a module is added or updated, a reception apparatus can detect it at once. Accordingly, the same functions as the above embodiment can be achieved by using particular modules instead of event messages.

For details on format of modules and detection of added or changed modules in reception apparatuses, see the ARIB STD-B24 specification "Data Broadcast Coding and Transmission in Digital Broadcasting".

Also, a program that execute the operations of the present invention on a computer may be distributed for transactions, via computer-readable recording media or networks.

The computer-readable recording media mentioned here may be removable recording media such as floppy disks, CDs, MOs, DVDs, and memory cards, or fixed recording media such as hard disks and semiconductor memories.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A data broadcast apparatus for repeatedly broadcasting broadcast data using a carousel method, to a reception apparatus which stores the broadcast data into a memory and reproduces the broadcast data stored in the memory, comprising:

storing means for storing first broadcast data and second broadcast data;

detecting means for detecting a reproduction stop event which prohibits the reception apparatus from reproducing the first broadcast data;

broadcasting means for (a) repeatedly broadcasting the first broadcast data and the second broadcast data stored in the storing means, and (b) stopping the broadcast of the first broadcast data when the detecting means detects the reproduction stop event; and instructing means for having the broadcasting means broadcast a switch instruction, the switch instruction instructing the reception apparatus to stop reproducing the first broadcast data and start reproducing the second broadcast data when the broadcast of the first broadcast data is stopped.

2. The data broadcast apparatus of claim 1, wherein the switch instruction instructs the reception apparatus to stop reproducing the first broadcast data and start reproducing the second broadcast data upon receiving the switch instruction, and the instructing means has the broadcasting means broadcast the switch instruction when the detecting means detects the reproduction stop event, so that the reception apparatus will stop reproducing the first broadcast data and start reproducing the second broadcast data upon receiving the switch instruction.

3. The data broadcast apparatus of claim 2, wherein the switch instruction is broadcast as an event message or a module that has a specific identifier.

4. The data broadcast apparatus of claim 1, wherein the broadcasting means starts broadcasting an empty carousel corresponding to the first broadcast data when the detecting means detects the reproduction stop event, the switch instruction instructs the reception apparatus to stop reproducing the first broadcast data and start reproducing the second broadcast data upon starting to receive the empty carousel, and the instructing means has the broadcasting means broadcast the switch instruction before the detecting means detects the reproduction stop event, so that the reception apparatus will stop reproducing the first broadcast data and start reproducing the second broadcast data upon starting to receive the empty carousel.

5. The data broadcast apparatus of claim 1, wherein the switch instruction instructs the reception apparatus to stop reproducing the first broadcast data and start reproducing the second broadcast data upon detecting that the reception apparatus no longer receives the first broadcast data, and the instructing means has the broadcasting means broadcast the switch instruction before the detecting means detects the reproduction stop event, so that the reception apparatus will stop reproducing the first broadcast data and start reproducing the second broadcast data upon detecting that the reception apparatus no longer receives the first broadcast data.

6. The data broadcast apparatus of claim 1, wherein after detecting the reproduction stop event, the detecting means detects a reproduction resume event which permits the reception apparatus to reproduce the first broadcast data, the broadcasting means resumes broadcasting the first broadcast data when the detecting means detects the reproduction resume event, and the instructing means has the broadcasting means broadcast a return instruction, the return instruction instructing the reception apparatus to stop reproducing the second broadcast data and resume reproducing the first broadcast data when the broadcast of the first broadcast data is resumed.

7. The data broadcast apparatus of claim 6, wherein the return instruction instructs the reception apparatus to stop reproducing the second broadcast data and resume reproducing the first broadcast data upon receiving the return instruction, and the instructing means has the broadcasting means broadcast the return instruction by attaching the return instruction to the second broadcast data when the detecting means detects the reproduction resume event, so that the reception apparatus will stop reproducing the second broadcast data and resume reproducing the first broadcast data upon receiving the return instruction.

8. The data broadcast apparatus of claim 7, wherein the return instruction is broadcast as an event message or a module that has a specific identifier.

9. The data broadcast apparatus of claim 6, wherein the broadcasting means starts broadcasting an empty carousel corresponding to the first broadcast data when the detecting means detects the reproduction stop event, and stops broadcasting the empty carousel when the detecting means detects the reproduction resume event, the return instruction instructs the reception apparatus to stop reproducing the second broadcast data and resume reproducing the first broadcast data upon stopping receiving the empty carousel, and the instructing means has the broadcasting means broadcast the return instruction before the detecting means detects the reproduction resume event, so that the reception apparatus will stop reproducing the second broadcast data and resume reproducing the first broadcast data upon stopping receiving the empty carousel.

10. The data broadcast apparatus of claim 6, wherein the return instruction instructs the reception apparatus to stop reproducing the second broadcast data and resume reproducing the first broadcast data upon detecting that the reception apparatus resumes receiving the first broadcast data, and the instructing means has the broadcasting means broadcast the return instruction before the detecting means detects the reproduction resume event, so that the reception apparatus will stop reproducing the second broadcast data and resume reproducing the first broadcast data upon detecting that the reception apparatus resumes receiving the first broadcast data.

11. A data broadcast apparatus for repeatedly broadcasting broadcast data using a carousel method, to a reception apparatus which stores the broadcast data into a memory and reproduces the broadcast data stored in the memory, comprising:

storing means for storing first broadcast data and second broadcast data;

detecting means for detecting a reproduction stop event which prohibits the reception apparatus from reproducing the first broadcast data;

broadcasting means for (a) repeatedly broadcasting the first broadcast data and the second broadcast data stored in the storing means, and (b) stopping the broadcast of the first broadcast data when the detecting means detects the reproduction stop event; and instructing means for having the broadcasting means broadcast a disable instruction, the disable instruction instructing the reception apparatus to refrain from switching reproduction from the second broadcast data to the first broadcast data when the broadcast of the first broadcast data is stopped.

12. The data broadcast apparatus of claim 11, wherein the disable instruction instructs the reception apparatus to refrain from switching the reproduction from the second broadcast data to the first broadcast data upon receiving the disable instruction, and the instructing means has the broadcasting means broadcast the disable instruction when the detecting means detects the reproduction stop event, so that the reception apparatus will refrain from switching the reproduction from the second broadcast data to the first broadcast data upon receiving the disable instruction.

13. The data broadcast apparatus of claim 12, wherein the disable instruction is broadcast as an event message or a module that has a specific identifier.

14. The data broadcast apparatus of claim 11, wherein the broadcasting means starts broadcasting an empty carousel corresponding to the first broadcast data when the detecting means detects the reproduction stop event, the disable instruction instructs the reception apparatus to refrain from switching the reproduction from the second broadcast data to the first broadcast data upon starting to receive the empty carousel, and the instructing means has the broadcasting means broadcast the disable instruction before the detecting means detects the reproduction stop event, so that the reception apparatus will refrain from switching the reproduction from the second broadcast data to the first broadcast data upon starting to receive the empty carousel.

15. The data broadcast apparatus of claim 11, wherein the disable instruction instructs the reception apparatus to refrain from switching the reproduction from the second broadcast data to the first broadcast data upon detecting that the reception apparatus no longer receives the first broadcast data, and the instructing means has the broadcasting means broadcast the disable instruction before the detecting means detects the reproduction stop event, so that the reception apparatus will refrain from switching the reproduction from the second broadcast data to the first broadcast data upon detecting that the reception apparatus no longer receives the first broadcast data.

16. A data broadcast apparatus for continuously broadcasting program data, and repeatedly broadcasting additional data using a carousel method, to a reception apparatus which stores the additional data into a memory and reproduces the additional data stored in the memory, comprising:

storing means for storing scheduled program data which is scheduled to be broadcast, related additional data which relates to the scheduled program data, and unrelated additional data which does not relate to the scheduled program data;

acquiring means for acquiring priority program data which has a higher priority than the scheduled program data;

broadcasting means for (a) continuously broadcasting the scheduled program data stored in the storing means, (b)

repeatedly broadcasting the related additional data and the unrelated additional data stored in the storing means, and (c) stopping the broadcast of the scheduled program data and starting broadcasting the priority program data when the acquiring means acquires the priority program data; and instructing means for having the broadcasting means broadcast a switch instruction, the switch instruction instructing the reception apparatus to stop reproducing the related additional data and start reproducing the unrelated additional data when the broadcast of the scheduled program data is stopped.

17. The data broadcast apparatus of claim 16, wherein the switch instruction instructs the reception apparatus to stop reproducing the related additional data and start reproducing the unrelated additional data upon receiving the switch instruction, and the instructing means has the broadcasting means broadcast the switch instruction when the acquiring means acquires the priority program data, so that the reception apparatus will stop reproducing the related additional data and start reproducing the unrelated additional data upon receiving the switch instruction.

18. The data broadcast apparatus of claim 17, wherein the switch instruction is broadcast as an event message or a module that has a specific identifier.

19. The data broadcast apparatus of claim 16, wherein the broadcasting means stops broadcasting the related additional data and starts broadcasting an empty carousel corresponding to the related additional data, when the acquiring means acquires the priority program data, the switch instruction instructs the reception apparatus to stop reproducing the related additional data and start reproducing the unrelated additional data upon starting to receive the empty carousel, and the instructing means has the broadcasting means broadcast the switch instruction before the acquiring means acquires the priority program data, so that the reception apparatus will stop reproducing the related additional data and start reproducing the unrelated additional data upon starting to receive the empty carousel.

20. The data broadcast apparatus of claim 16, wherein the broadcasting means stops broadcasting the related additional data when the acquiring means acquires the priority program data, the switch instruction instructs the reception apparatus to stop reproducing the related additional data and start reproducing the unrelated additional data upon detecting that the reception apparatus no longer receives the related additional data, and the instructing means has the broadcasting means broadcast the switch instruction before the acquiring means acquires the priority program data, so that the reception apparatus will stop reproducing the related additional data and start reproducing the unrelated additional data upon detecting that the reception apparatus no longer receives the related additional data.

21. The data broadcast apparatus of claim 16, wherein the broadcasting means resumes broadcasting the scheduled program data when the broadcast of the priority program data ends, and the instructing means has the broadcasting means broadcast a return instruction, the return instruction instructing the reception apparatus to stop reproducing the unrelated additional data and resume reproducing the related additional data when the broadcast of the priority program data ends.

22. The data broadcast apparatus of claim 21, wherein the return instruction instructs the reception apparatus to stop reproducing the unrelated additional data and resume reproducing the related additional data upon receiving the return instruction, and the instructing means has the broadcasting means broadcast the return instruction by attaching the return instruction to the unrelated additional data when the broadcast of the priority program data ends, so that the reception apparatus will stop reproducing the unrelated additional data and resume reproducing the related additional data upon receiving the return instruction.

23. The data broadcast apparatus of claim 22, wherein the return instruction is broadcast as an event message or a module that has a specific identifier.

24. The data broadcast apparatus of claim 21, wherein the broadcasting means stops broadcasting the related additional data and starts broadcasting an empty carousel corresponding to the related additional data when the acquiring means acquires the priority program data, and stops broadcasting the empty carousel and resumes broadcasting the related additional data when the broadcast of the priority program data ends, the return instruction instructs the reception apparatus to stop reproducing the unrelated additional data and resume reproducing the related additional data upon stopping receiving the empty carousel, and the instructing means has the broadcasting means broadcast the return instruction before the broadcast of the priority program data ends, so that the reception apparatus will stop reproducing the unrelated additional data and resume reproducing the related additional data upon stopping receiving the empty carousel.

25. The data broadcast apparatus of claim 21, wherein the broadcasting means stops broadcasting the related additional data when the acquiring means acquires the priority program data, and resumes broadcasting the related additional data when the broadcast of the priority program data ends, the return instruction instructs the reception apparatus to stop reproducing the unrelated additional data and resume reproducing the related additional data upon detecting that the reception apparatus resumes receiving the related additional data, and the instructing means has the broadcasting means broadcast the return instruction before the broadcast of the priority program data ends, so that the reception apparatus will stop reproducing the unrelated additional data and resume reproducing the related additional data upon detecting that the reception apparatus resumes receiving the related additional data.

26. A data broadcast apparatus for continuously broadcasting program data, and repeatedly broadcasting additional data using a carousel method, to a reception apparatus which stores the additional data into a memory and reproduces the additional data stored in the memory, comprising:

storing means for storing scheduled program data which is scheduled to be broadcast, related additional data which relates to the scheduled program data, and unrelated additional data which does not relate to the scheduled program data;

acquiring means for acquiring priority program data which has a higher priority than the scheduled program data;

broadcasting means for (a) continuously broadcasting the scheduled program data stored in the storing means, (b) repeatedly broadcasting the related additional data and the unrelated additional data stored in the storing means, and (c) stopping the broadcast of the scheduled program data and starting broadcasting the priority program data when the acquiring means acquires the priority program data; and instructing means for having the broadcasting means broadcast a disable instruction, the disable instruction instructing the reception apparatus to refrain from switching reproduction from the unrelated additional data to the related additional data when the broadcast of the scheduled program data is stopped.

27. The data broadcast apparatus of claim 26,
wherein the disable instruction instructs the reception apparatus to refrain from switching the reproduction from the unrelated additional data to the related additional data upon receiving the disable instruction, and
the instructing means has the broadcasting means broadcast the disable instruction when the acquiring means acquires the priority program data, so that the reception apparatus will refrain from switching the reproduction from the unrelated additional data to the related additional data upon receiving the disable instruction.

28. The data broadcast apparatus of claim 27,
wherein the disable instruction is broadcast as an event message or a module that has a specific identifier.

29. The data broadcast apparatus of claim 26,
wherein the broadcasting means stops broadcasting the related additional data and starts broadcasting an empty carousel corresponding to the related additional data, when the acquiring means acquires the priority program data,
the disable instruction instructs the reception apparatus to refrain from switching the reproduction from the unrelated additional data to the related additional data upon starting to receive the empty carousel, and
the instructing means has the broadcasting means broadcast the disable instruction before the acquiring means acquires the priority program data, so that the reception apparatus will refrain from switching the reproduction from the unrelated additional data to the related additional data upon starting to receive the empty carousel.

30. The data broadcast apparatus of claim 26,
wherein the broadcasting means stops broadcasting the related additional data when the acquiring means acquires the priority program data,
the disable instruction instructs the reception apparatus to refrain from switching the reproduction from the unrelated additional data to the related additional data upon detecting that the reception apparatus no longer receives the related additional data, and
the instructing means has the broadcasting means broadcast the disable instruction before the acquiring means acquires the priority program data, so that the reception apparatus will refrain from switching the reproduction from the unrelated additional data to the related additional upon detecting that the reception apparatus no longer receives the related additional data.

31. A computer program embodied on a computer readable medium for use with a computer and a storing device, for repeatedly broadcasting broadcast data using a carousel method to a reception apparatus which stores the broadcast data into a memory and reproduces the broadcast data stored in the memory, wherein the storing device stores first broadcast data and second broadcast data, the computer program comprising:
a detecting step for detecting a reproduction stop event which prohibits the reception apparatus from reproducing the first broadcast data;
a broadcasting step for (a) repeatedly broadcasting the first broadcast data and the second broadcast data stored in the storing device, and (b) stopping the broadcast of the first broadcast data when the detecting step detects the reproduction stop event; and
an instructing step for broadcasting a switch instruction, the switch instruction instructing the reception apparatus to stop reproducing the first broadcast data and start reproducing the second broadcast data when the broadcast of the first broadcast data is stopped.

32. The computer program of claim 31,
wherein after detecting the reproduction stop event, the detecting step detects a reproduction resume event which permits the reception apparatus to reproduce the first broadcast data,
the broadcasting step resumes broadcasting the first broadcast data when the detecting step detects the reproduction resume event, and
the instructing step broadcasts a return instruction, the return instruction instructing the reception apparatus to stop reproducing the second broadcast data and resume reproducing the first broadcast data when the broadcast of the first broadcast data is resumed.

33. A computer program embodied on a computer readable medium for use with a computer and a storing device, for repeatedly broadcasting broadcast data using a carousel method to a reception apparatus which stores the broadcast data into a memory and reproduces the broadcast data stored in the memory, wherein the storing device stores first broadcast data and second broadcast data, the computer program comprising:
a detecting step for detecting a reproduction stop event which prohibits the reception apparatus from reproducing the first broadcast data;
a broadcasting step for (a) repeatedly broadcasting the first broadcast data and the second broadcast data stored in the storing device, and (b) stopping the broadcast of the first broadcast data when the detecting step detects the reproduction stop event; and
an instructing step for broadcasting a disable instruction, the disable instruction instructing the reception apparatus to refrain from switching reproduction from the second broadcast data to the first broadcast data when the broadcast of the first broadcast data is stopped.

34. A computer program embodied on a computer readable medium for use with a computer and a storing device, for continuously broadcasting program data, and repeatedly broadcasting additional data using a carousel method, to a reception apparatus which stores the additional data into a memory and reproduces the additional data stored in the memory, wherein the storing device stores scheduled program data which is scheduled to be broadcast, related additional data which relates to the scheduled program data, and unrelated additional data which does not relate to the scheduled program data, the computer program comprising:
an acquiring step for acquiring priority program data which has a higher priority than the scheduled program data;
a broadcasting step for (a) continuously broadcasting the scheduled program data stored in the storing device, (b) repeatedly broadcasting the related additional data and the unrelated additional data stored in the storing device, and (c) stopping the broadcast of the scheduled program data and starting broadcasting the priority program data when the acquiring step acquires the priority program data; and
an instructing step for broadcasting a switch instruction, the switch instruction instructing the reception apparatus to stop reproducing the related additional data and start reproducing the unrelated additional data when the broadcast of the scheduled program data is stopped.

35. The computer program of claim 34,
wherein the broadcasting step resumes broadcasting the scheduled program data when the broadcast of the priority program data ends, and
the instructing step broadcasts a return instruction, the return instruction instructing the reception apparatus to stop reproducing the unrelated additional data and resume reproducing the related additional data when the broadcast of the priority program data ends.

36. A computer program embodied on a computer readable medium for use with a computer and a storing device, for continuously broadcasting program data, and repeatedly broadcasting additional data using a carousel method, to a reception apparatus which stores the additional data into a memory and reproduces the additional data stored in the memory, wherein the storing device stores scheduled program data which is scheduled to be broadcast, related additional data which relates to the scheduled program data, and unrelated additional data which does not relate to the scheduled program data, the computer program comprising:
an acquiring step for acquiring priority program data which has a higher priority than the scheduled program data;
a broadcasting step for (a) continuously broadcasting the scheduled program data stored in the storing device, (b) repeatedly broadcasting the related additional data and the unrelated additional data stored in the storing device, and (c) stopping the broadcast of the scheduled program data and starting broadcasting the priority program data when the acquiring step acquires the priority program data; and
an instructing step for broadcasting a disable instruction, the disable instruction instructing the reception apparatus to refrain from switching reproduction from the unrelated additional data to the related additional data when the broadcast of the scheduled program data is stopped.

37. A data broadcast method used in a data broadcast apparatus equipped with a storing device, for repeatedly broadcasting broadcast data using a carousel method to a reception apparatus which stores the broadcast data into a memory and reproduces the broadcast data stored in the memory, wherein the storing device stores first broadcast data and second broadcast data, the data broadcast method comprising:
a detecting step for detecting a reproduction stop event which prohibits the reception apparatus from reproducing the first broadcast data;
a broadcasting step for (a) repeatedly broadcasting the first broadcast data and the second broadcast data stored in the storing device, and (b) stopping the broadcast of the first broadcast data when the detecting step detects the reproduction stop event; and
an instructing step for broadcasting a switch instruction, the switch instruction instructing the reception apparatus to stop reproducing the first broadcast data and start reproducing the second broadcast data when the broadcast of the first broadcast data is stopped.

38. The data broadcast method of claim 37,
wherein after detecting the reproduction stop event, the detecting step detects a reproduction resume event which permits the reception apparatus to reproduce the first broadcast data,
the broadcasting step resumes broadcasting the first broadcast data when the detecting step detects the reproduction resume event, and
the instructing step broadcasts a return instruction, the return instruction instructing the reception apparatus to stop reproducing the second broadcast data and resume reproducing the first broadcast data when the broadcast of the first broadcast data is resumed.

39. A data broadcast method used in a data broadcast apparatus equipped with a storing device, for repeatedly broadcasting broadcast data using a carousel method to a reception apparatus which stores the broadcast data into a memory and reproduces the broadcast data stored in the memory, wherein the storing device stores first broadcast data and second broadcast data, the data broadcast method comprising:
a detecting step for detecting a reproduction stop event which prohibits the reception apparatus from reproducing the first broadcast data;
a broadcasting step for (a) repeatedly broadcasting the first broadcast data and the second broadcast data stored in the storing device, and (b) stopping the broadcast of the first broadcast data when the detecting step detects the reproduction stop event; and
an instructing step for broadcasting a disable instruction, the disable instruction instructing the reception apparatus to refrain from switching reproduction from the second broadcast data to the first broadcast data when the broadcast of the first broadcast data is stopped.

40. A data broadcast method used in a data broadcast apparatus equipped with a storing device, for continuously broadcasting program data, and repeatedly broadcasting additional data using a carousel method, to a reception apparatus which stores the additional data into a memory and reproduces the additional data stored in the memory, wherein the storing device stores scheduled program data which is scheduled to be broadcast, related additional data which relates to the scheduled program data, and unrelated additional data which does not relate to the scheduled program data, the data broadcast method comprising:
an acquiring step for acquiring priority program data which has a higher priority than the scheduled program data;
a broadcasting step for (a) continuously broadcasting the scheduled program data stored in the storing device, (b) repeatedly broadcasting the related additional data and the unrelated additional data stored in the storing device, and (c) stopping the broadcast of the scheduled program data and starting broadcasting the priority program data when the acquiring step acquires the priority program data; and
an instructing step for broadcasting a switch instruction, the switch instruction instructing the reception apparatus to stop reproducing the related additional data and start reproducing the unrelated additional data when the broadcast of the scheduled program data is stopped.

41. The data broadcast method of claim 40,
wherein the broadcasting step resumes broadcasting the scheduled program data when the broadcast of the priority program data ends, and
the instructing step broadcasts a return instruction, the return instruction instructing the reception apparatus to stop reproducing the unrelated additional data and resume reproducing the related additional data when the broadcast of the priority program data ends.

42. A data broadcast method used in a data broadcast apparatus equipped with a storing device, for continuously broadcasting program data, and repeatedly broadcasting additional data using a carousel method, to a reception apparatus which stores the additional data into a memory and reproduces the additional data stored in the memory, wherein the storing device stores scheduled program data which is scheduled to be broadcast, related additional data which relates to the scheduled program data, and unrelated additional data which does not relate to the scheduled program data, the data broadcast method comprising:

an acquiring step for acquiring priority program data which has a higher priority than the scheduled program data;

a broadcasting step for (a) continuously broadcasting the scheduled program data stored in the storing device, (b) repeatedly broadcasting the related additional data and the unrelated additional data stored in the storing device, and (c) stopping the broadcast of the scheduled program data and starting broadcasting the priority program data when the acquiring step acquires the priority program data; and an instructing step for broadcasting a disable instruction, the disable instruction instructing the reception apparatus to refrain from switching reproduction from the unrelated additional data to the related additional data when the broadcast of the scheduled program data is stopped.

* * * * *